(12) United States Patent
Terada

(10) Patent No.: US 6,246,832 B1
(45) Date of Patent: Jun. 12, 2001

(54) CAMERA AND LENS BARREL FOR USE IN THE CAMERA

(75) Inventor: Hiroshi Terada, Mitaka (JP)

(73) Assignee: Olympus Optical Co., Ltd., Tokyo (JP)

(*) Notice: Subject to any disclaimer, the term of this patent is extended or adjusted under 35 U.S.C. 154(b) by 0 days.

(21) Appl. No.: 09/406,245

(22) Filed: Sep. 24, 1999

(30) Foreign Application Priority Data

Oct. 5, 1998 (JP) .................................. 10-282680
Oct. 19, 1998 (JP) .................................. 10-297063

(51) Int. Cl.$^7$ .................................................. G03B 7/00
(52) U.S. Cl. ............................. 396/63; 396/505; 359/676; 359/740
(58) Field of Search .......................... 396/72, 505, 509, 396/462, 63, 64; 359/695, 676, 740, 739, 738, 782, 784, 686

(56) References Cited

U.S. PATENT DOCUMENTS 5,790,316 * 8/1998 Terasawa et al. .............. 359/740 X

FOREIGN PATENT DOCUMENTS 63-43114    2/1988 (JP) .

* cited by examiner

Primary Examiner—W. B. Perkey
(74) Attorney, Agent, or Firm—Frishauf, Holtz, Goodman, Langer & Chick, P.C.

(57) ABSTRACT

In order to realize a lens barrel or camera which is light in weight and small in size and which has performance as high as a single-focus lens, a photographing optical system employed in the lens barrel or camera has four lens groups, and at least two diaphragms are arranged at different positions. Despite the simple structure it has, the photographing optical system enables switching among a number of focal lengths. The diaphragms include: a first diaphragm (diaphragm unit A) arranged at a first inter-lens position defined inside the photographing optical system and controlling the amount of light passing through the system; and a second diaphragm (diaphragm unit B) arranged at a second inter-lens position defined inside the system and controlling the amount of light passing through the system.

24 Claims, 15 Drawing Sheets

(RETRACTED STATE)

(RETRACTED STATE)

(TELEPHOTO STATE)

RETRO FOCUS TYPE

TELEPHOTO TYPE

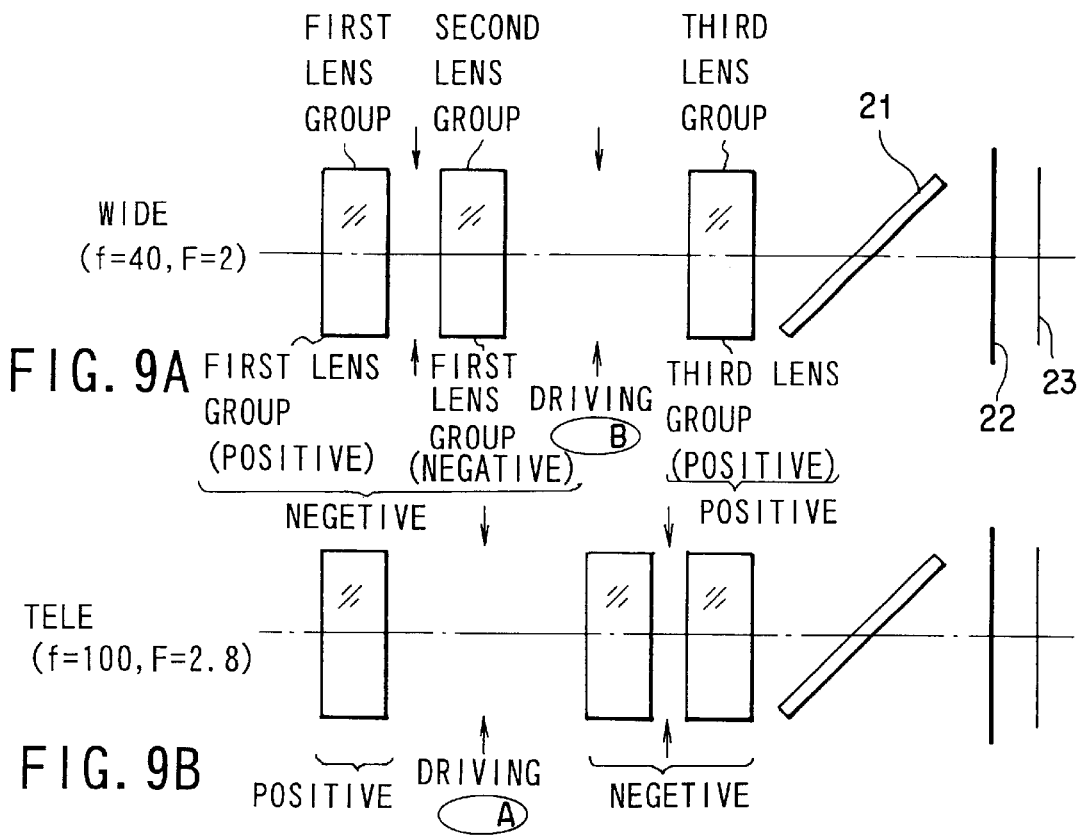
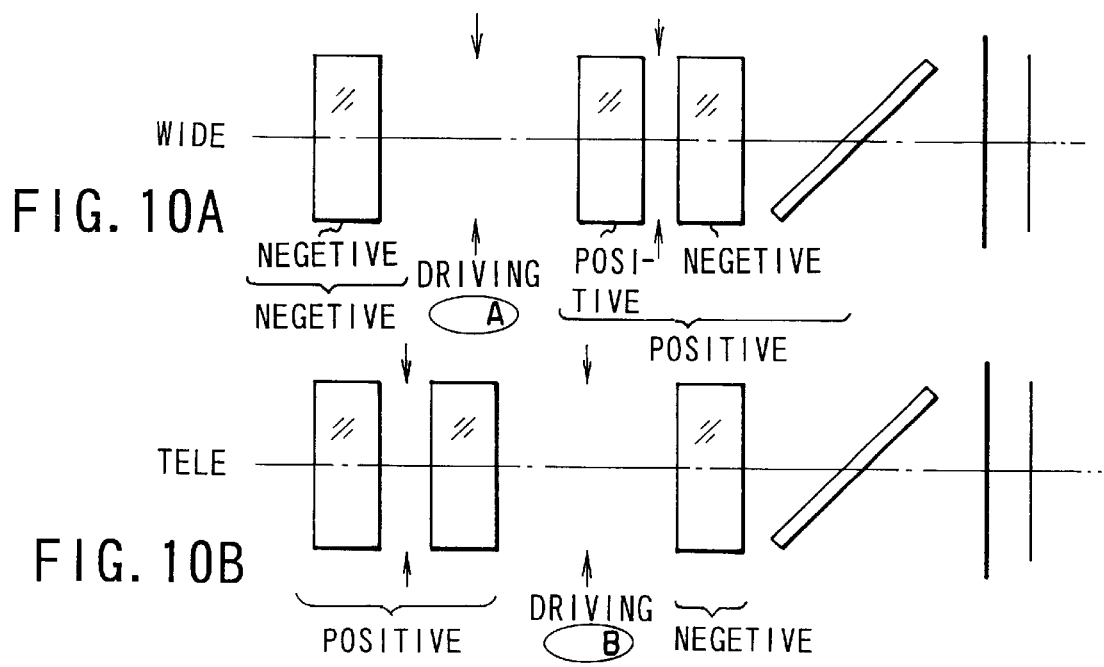

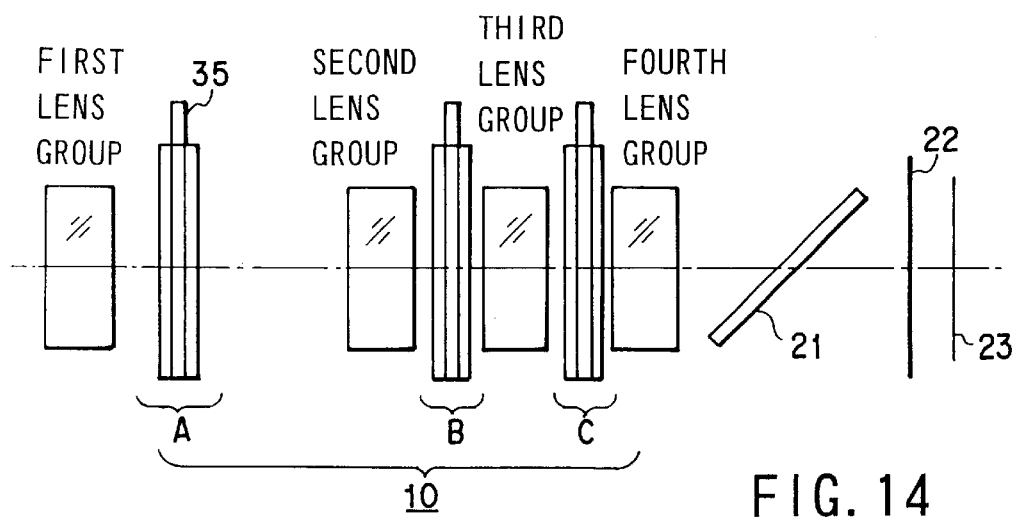
FIG. 14
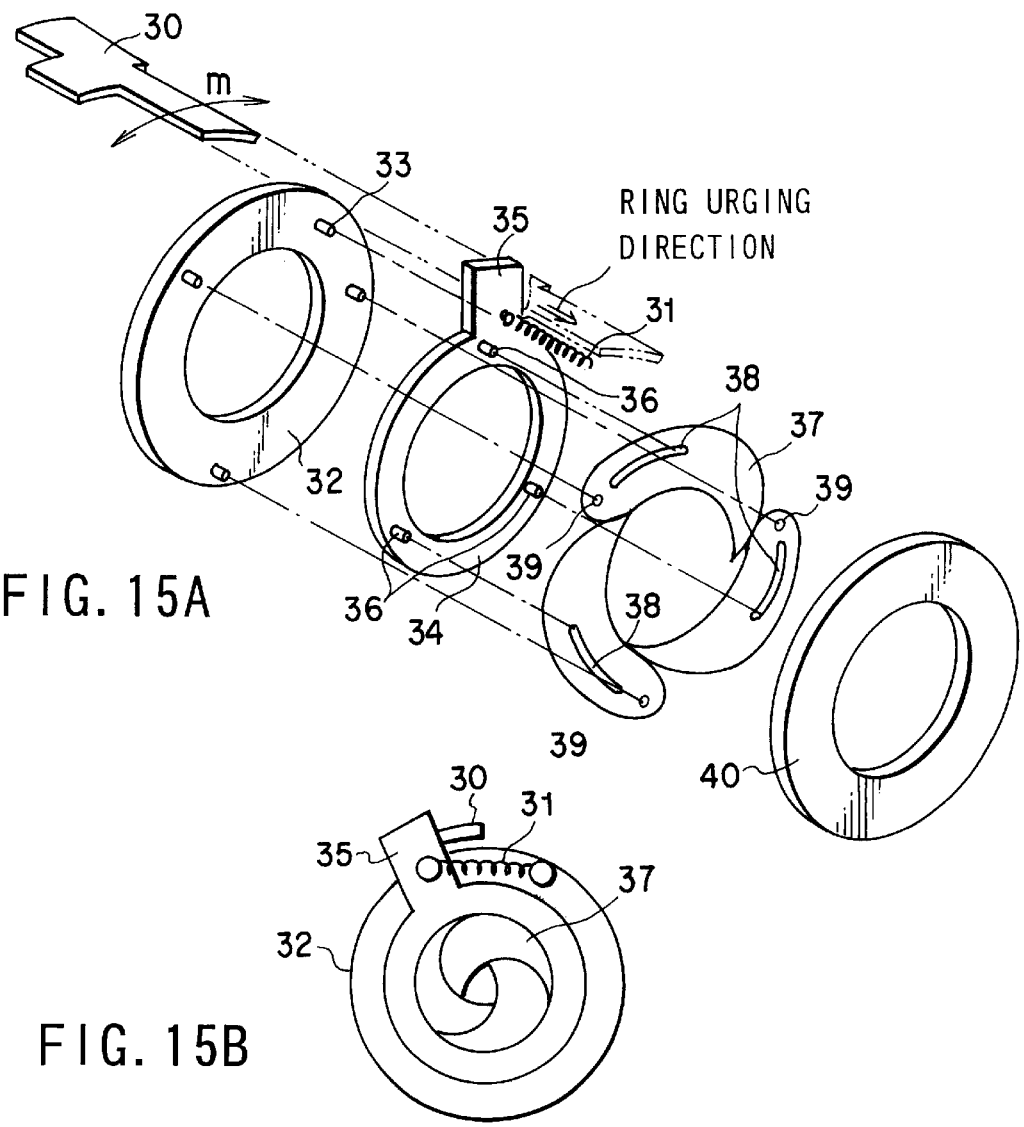
FIG. 15A
FIG. 15B

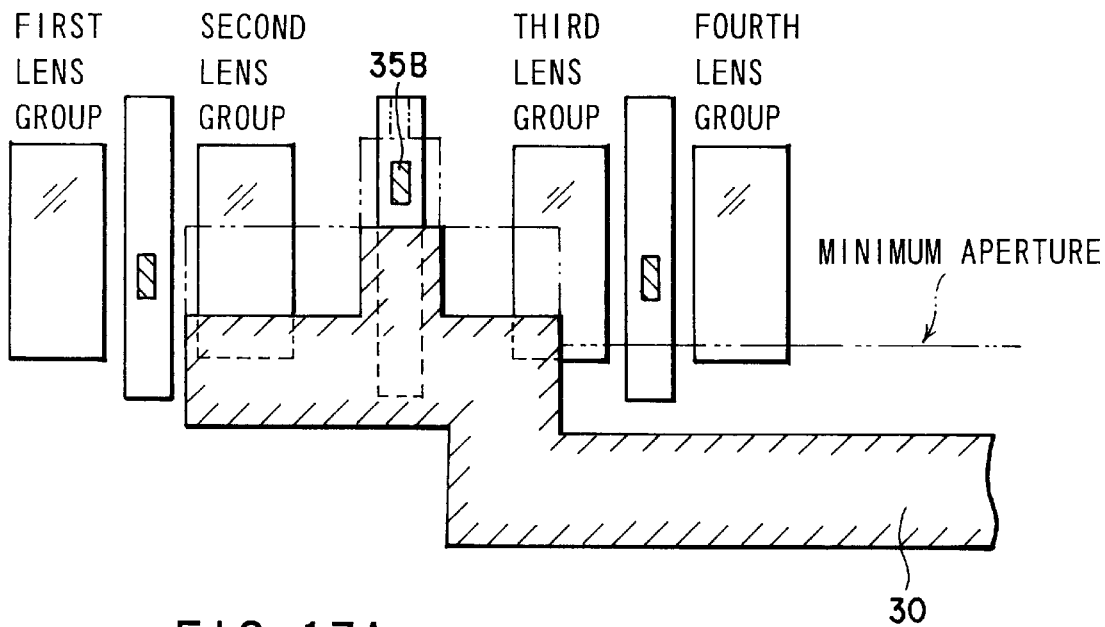
FIG. 17A    STANDARD STATE
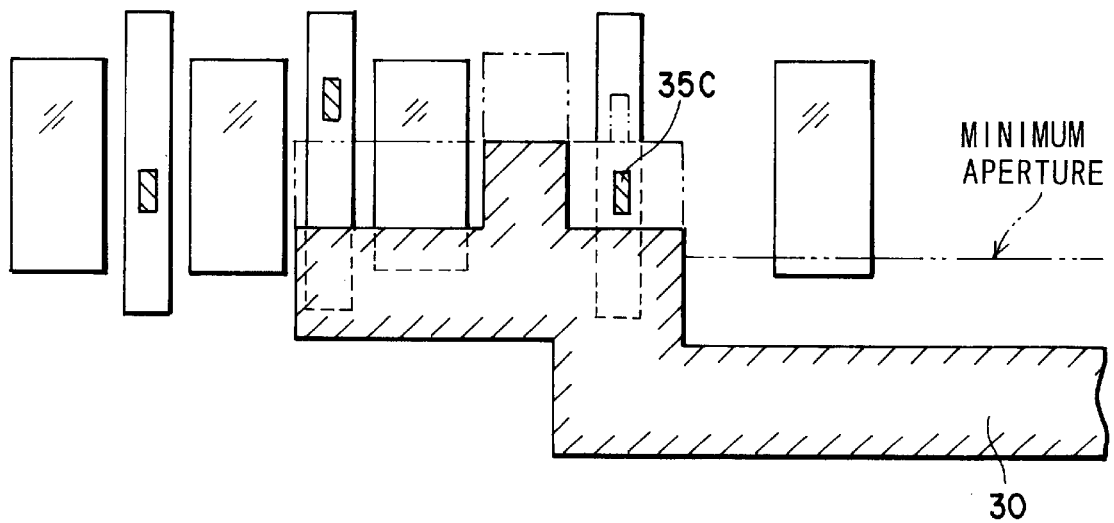
FIG. 17B    TELEPHOTO STATE

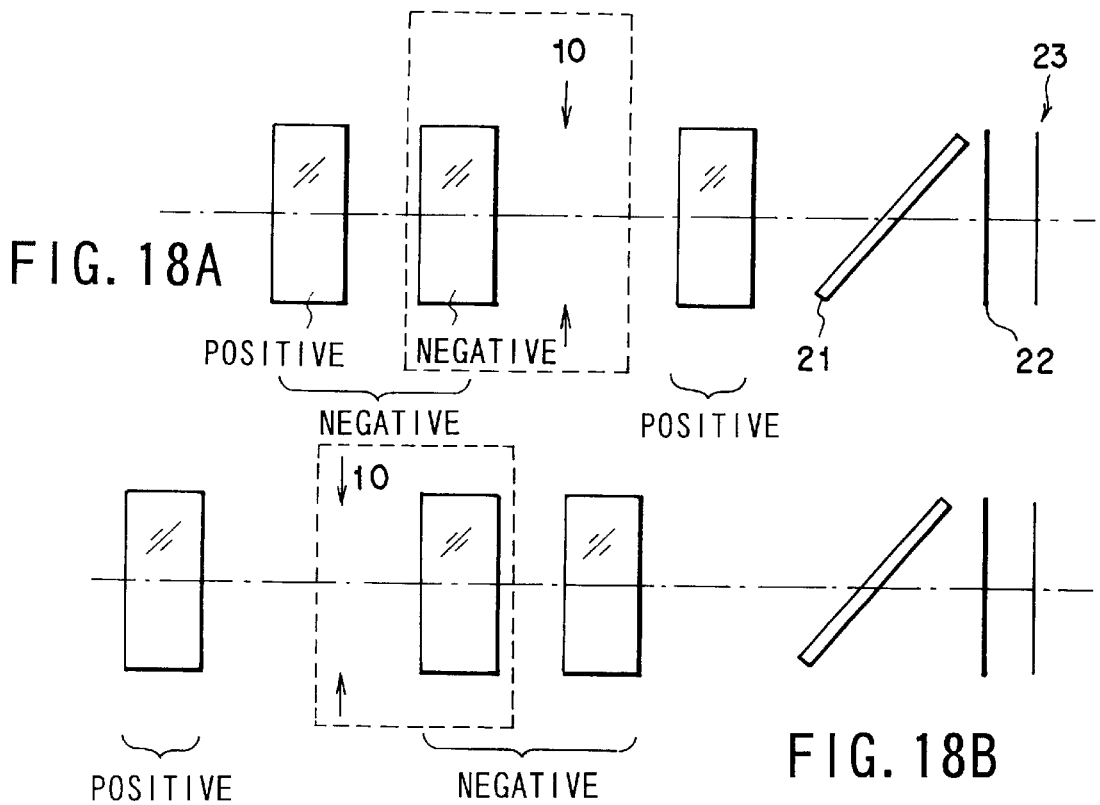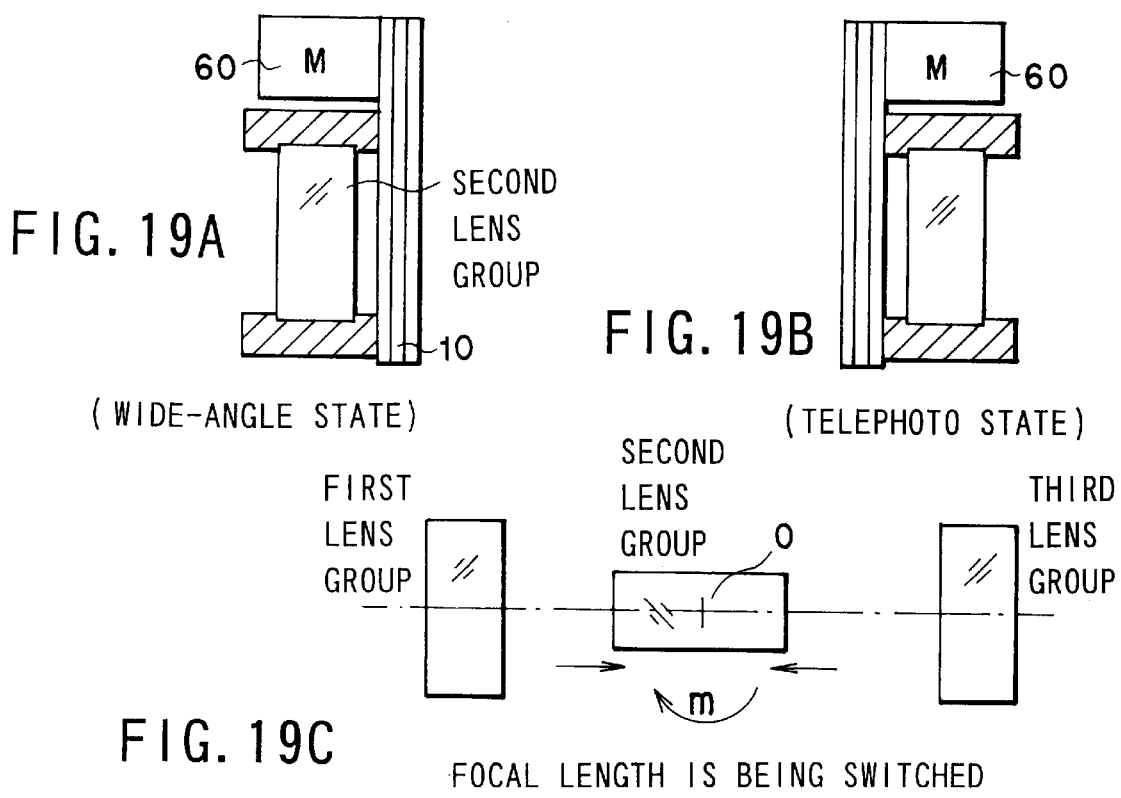

CAMERA AND LENS BARREL FOR USE IN THE CAMERA

BACKGROUND OF THE INVENTION

The present invention relates to a lens structure which is incorporated in a camera having two or three focuses to realize a small-sized high-performance camera.

There are various kinds of technology for switching optical systems from one to another. A general kind of technology is to employ an additional optical element and use this element to change the focal distance of an optical system. Systems using such an additional optical element may be classified as a front type and a rear type. In the front type system a lens power-varying element is arranged in front of the lens system fixed to an optical apparatus, while in the rear type system it is arranged behind the lens system.

The front type system may be a combination of a standard lens (STAND) and a desired power-varying lens unit. An example of the power-varying lens unit is a telephoto lens (TELE) or a wide-angle lens (WIDE), and this power-varying lens is arranged in accordance with the need. The front type system may also be a combination of a wide-angle lens (WIDE) and a telephoto conversion lens (this combination provides a telephoto function). The front type system has to be inserted or removed each time the focal points are switched from one to another, which is very troublesome. In order to solve this problem, Jpn. Pat. Appln. KOKAI Publication No. 63-43114 discloses a lens body structure capable of varying the focal distance thereof. The lens body structure disclosed in this reference comprises a fixed lens system, and a single front conversion lens group (a power magnifying lens group) rotatably arranged in front of the fixed lens system. With the front conversion lens group being inverted in direction by means of a power-varying lever, the three distances corresponding to telegraphic, standard and wide-angle modes can be easily attained.

A two-focus camera (generally referred to as a TELE/WIDE camera) may be an example of the rear type system. The two-focus camera comprises a standard lens (STAND) and a desired power-varying lens unit. The standard lens is fixed, and the desired power-varying lens unit is inserted in accordance with the need.

In recent years, a zoom lens is in wide use. The zoom lens comprises a number of lenses, and the focal distance of the zoom lens is changed in a stepless manner by changing the distances between the lenses.

A structure wherein a fixed lens optical system is combined with a power-varying lens system is disadvantageous in that the total number of lenses is inevitably large. In addition, the rear type system described above is disadvantageous in that an image observed through it is dark. Even in a wide-angle mode, the structure includes a group of lenses that are not used to attain the function. It should be also noted that a mechanism for inserting or retreating a conversion lens group is required not only for the lenses which are used to attain the function but also for the lenses which are not used then. This being so, it is hard to design the structure to be small in size.

The lens body structure disclosed in KOKAI Publication No. 63-43114 may be useful because it enables easy switching of a focal distance. However, this lens body structure employs a conversion lens group that is rotatable in front of the fixed lens optical system. It is therefore very hard to design the lens body structure to be small in size.

The zoom lens is inevitably large and heavy since its lens structure remains unchanged without reference to the mode of the zoom lens, i.e., even when it is in the mode corresponding to the standard focal distance. In order for a zoom lens to be designed to be small in size, hard-to-work lenses, such as an aspheric lens, have to be employed. This results in a high manufacturing cost.

In an ordinary type of photographing lens for a camera, a diaphragm is fixedly arranged at a single position inside the optical system of the lens. Since the position at which the diaphragm is arranged is an important factor for determining the optical characteristic of the lens, it is preferable that the position be determined with a high degree of freedom. In other words, the fixed position of the diaphragm makes it hard to design the photographing lens. In order to realize a high-performance photographing lens which employs a single diaphragm and which has characteristics similar to those of a single-focus lens, it is necessary to employ an increased number of lens elements, as a result of which the resultant photographing lens is heavy and large.

Accordingly, an object of the present invention is to provide a camera having an optical system which is light in weight and small in size and which has performance as high as that of a single-focus lens. Another object of the present invention is to provide a lens barrel for use in the camera.

BRIEF SUMMARY OF THE INVENTION

To solve the above problems, the present invention provides a photographing lens which employs at least two diaphragms and arranges these diaphragms at different positions in such a manner that a number of different optical lengths can be easily switched from one to another.

According to the present invention, a plurality of diaphragms are arranged between the lenses of a lens barrel, and the diaphragm corresponding to the desired focal length can be easily selected by predetermined driving/switching means. A lens system suitable for the desired focal length can thus be obtained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 9A and 9B schematically show a "two-focus type" lens system which is according to the second embodiment of the present invention and which comprises three lens groups, FIG. 9A showing how the lens system is when it is in the wide-angle state, and FIG. 9B showing how the lens system is when it is in the telephoto state.

FIGS. 10A and 10B schematically show another "two-focus type" lens system which is according to the second embodiment of the present invention and which comprises three lens groups, FIG. 10A showing how the lens system is when it is in the wide-angle state, and FIG. 10A showing how the lens system is when it is in the telephoto state.

FIG. 14 schematically shows a photographing lens system which is according to the fourth embodiment of the present invention and which incorporates a plurality of diaphragm units.

FIG. 15A is a perspective exploded view showing the structure of a diaphragm unit, and FIG. 15B is a front view of the diaphragm unit in the assembled state.

FIG. 17A shows how the diaphragm unit and diaphragm lever of the present invention are related to each other in the standard mode, and FIG. 17B shows how they are related to each other in the telephoto mode.

FIGS. 18A and 18B show a "two-focus type" lens-and-diaphragm unit which is according to the fifth embodiment of the present invention and which comprises three lens groups, FIG. 18A showing how the lens-and-diaphragm unit is when it is in the wide-angle state, and FIG. 18B showing how the same unit is when it is in the telephoto state.

FIGS. 19A to 19C show a "two-focus type" lens-and-diaphragm unit which is according to the fifth embodiment of the present invention and which is switchable between the wide-angle mode and the telephoto mode, FIG. 19A being a sectional view showing how the unit is when it is in the wide-angle mode, FIG. 19B being an explanatory view showing how the unit is when it has been switched from the wide-angle mode to the telephoto mode, and FIG. 19C being a sectional view showing how the unit is when it is in the telephoto state.

DETAILED DESCRIPTION OF THE INVENTION

Figure 1A:
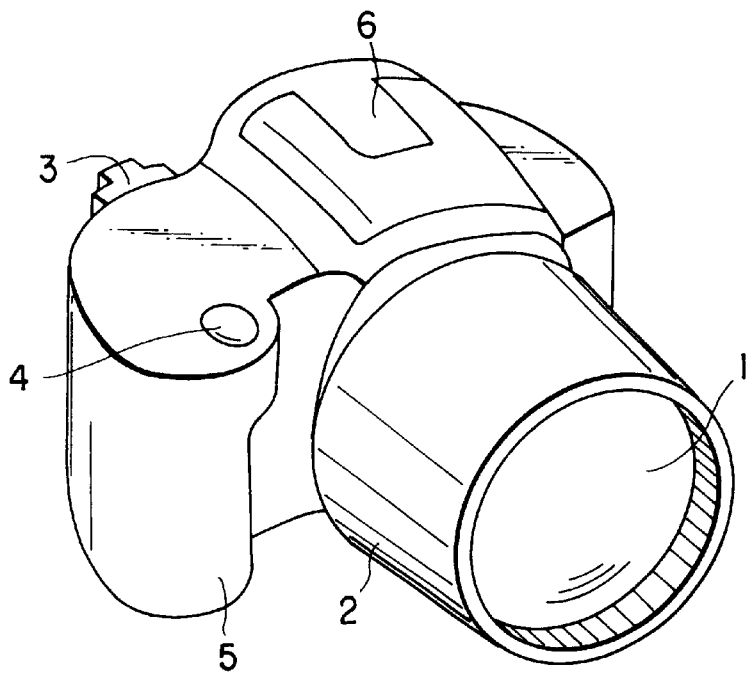
FIG. 1A is a perspective view showing a lens-integrated single lens reflex camera which is a "three-focus switching" type and which is in the retracted state.
Figure 1B:
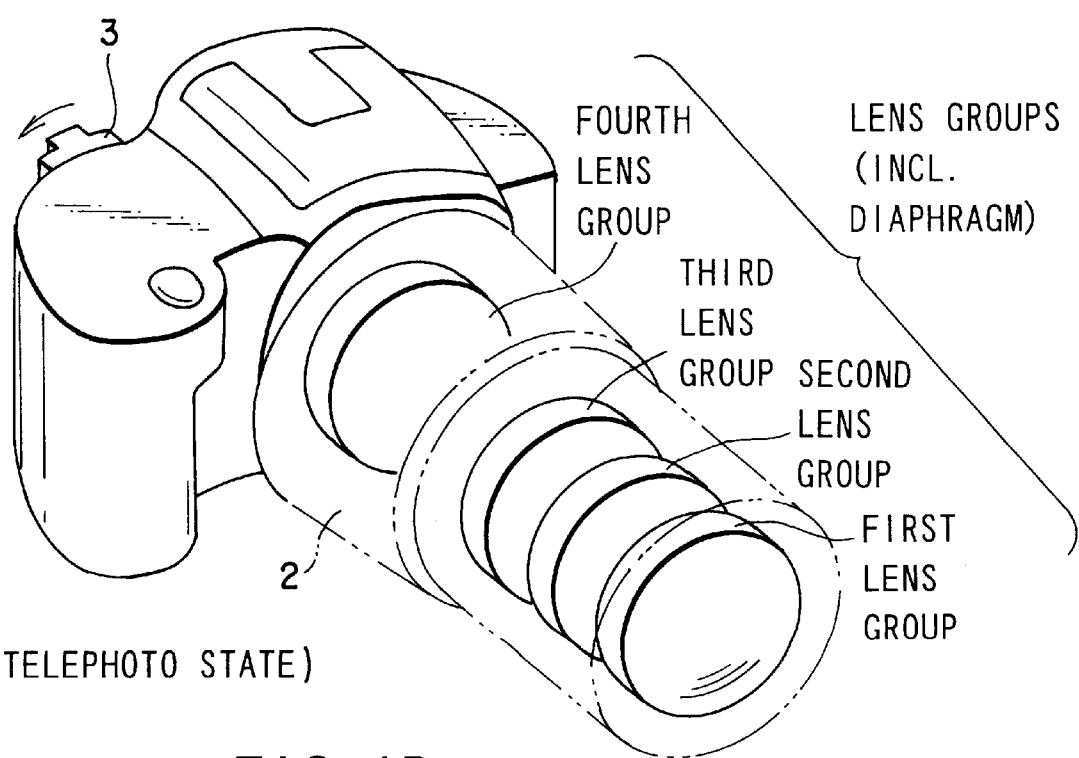
FIG. 1B is a partially-cutaway perspective view showing how the photographing lens system is when it is extended.

FIGS. 1A and 1B show an outward appearance of the lens-integrated single lens reflex camera which is a "three-focus switching" type and to which the present invention is applied. The state shown in FIG. 1A is the retracted state of the camera, i.e., the state where the main switch (not shown) of the camera is OFF and a photographing lens 1 is retracted into a lens barrel 2. In this state, the camera is shortest. When the main switch is turned on, the photographing lens 1 extends, and the camera becomes ready for photography.

When a focal distance switching lever 3 is kept operated in one direction, groups of lenses (first to fourth lens groups) of the photographing lens 1 further extend forward along the optical axis. The lens groups are extendible up to the telephoto position.

The photographing lens 1 is made up of a plurality of lens groups (first to fourth groups) and a plurality of diaphragm unit (not shown in FIG. 1B). The diaphragm units are movable along the optical axis together with the related lenses. The lens structure shown in FIG. 1B is a three-focus type made up of four groups of lenses.

Figure 2A:
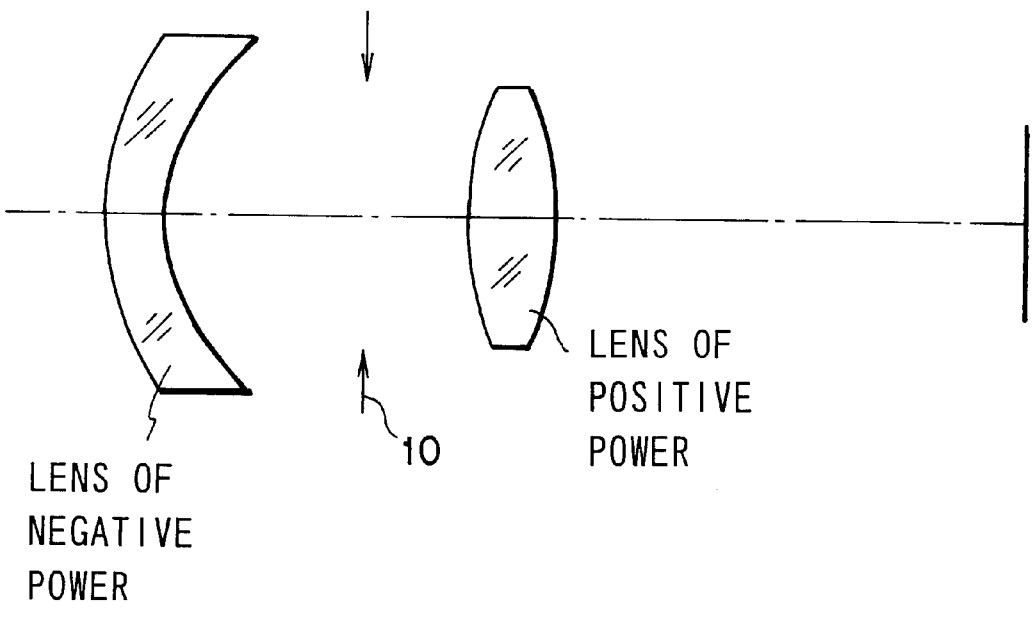
FIG. 2A illustrates a "retro focus type" structure which the single-focus lens of a single lens reflex camera uses at the time of wide-angle photography.
Figure 2B:
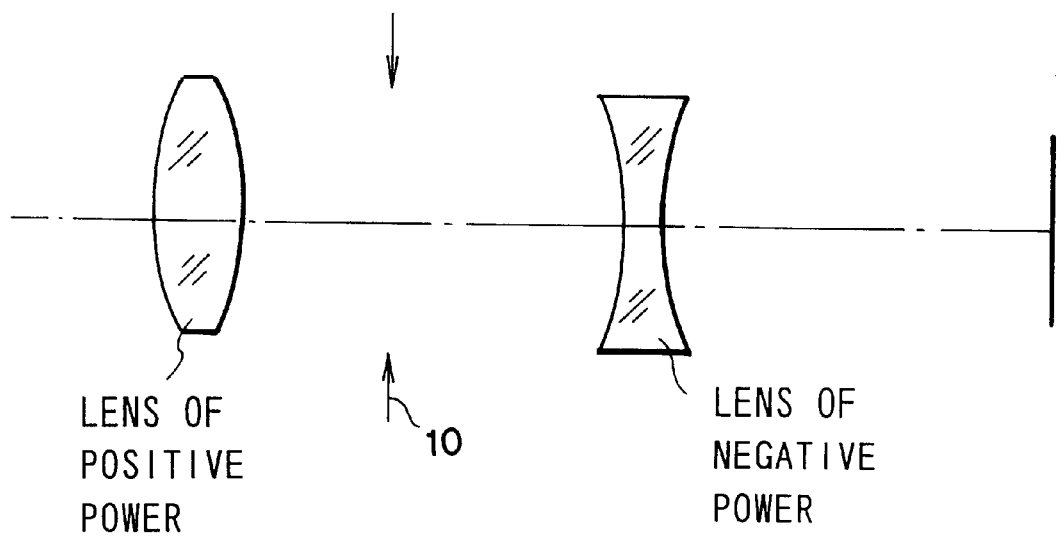
FIG. 2B illustrates a "telephoto type" structure used at the time of telephoto photography.

FIGS. 2A and 2B illustrate a technical idea underlying a single-focus lens which is for use in an ordinary single lens reflex camera. What is depicted in FIG. 2A is a wide system used at the time of wide-angle photography. This system is referred to as a "retro focus type", wherein the focal length is designed to be short so that the back focal distance is longer than it. This type of system is in general use. As shown in FIG. 2A, the system comprises a lens having a negative lens power, a diaphragm 10, and a lens having a positive lens power. These structural elements are arranged in such a manner that the lens with the negative lens power is closest to an object to be shot, the lens with the positive lens power farthest from the object, and the diaphragm therebetween.

What is depicted in FIG. 2B is a telephoto system used at the time of telephoto photography. In this system, the focal length is designed to be long so that the total length of the system can be short. This type of system is also in general use. As shown in FIG. 2B, the system comprises a lens having a positive lens power, a diaphragm 10, and a lens having a negative lens power. These structural elements are arranged in such a manner that the lens with the positive lens power is closest to an object to be shot, the lens with the negative lens power farthest from the object, and the diaphragm therebetween.

Although not shown, an ErnoStar type system is also a basic system used in general.

A system intermediate between the wide-angle system and the telephoto system is referred to as a standard system. This system has a focal distance of 50 mm, and the power distribution in the system is symmetric with reference to a diaphragm. In other words, the lens power on the left side of the diaphragm and the lens power on the right side thereof are controlled to be symmetric.

The standard system is generally realized as a "gauss type", wherein lens groups are arranged in such a manner that those arranged in front of the diaphragm and those arranged behind the diaphragm are substantially symmetric. A zoom lens having a large magnifying power employs a number of lens groups, and each lens group is made up a large number of lenses. This being so, the zoom lens having a large magnifying power is inevitably large and costly. In addition, since the zoom lens is required to attain predetermined optical characteristics in any state of operation between the wide-angle state and the telephoto state, it is not easy to provide the zoom lens with performance which is as high as that of a single-focus lens. In spite of this, however, the user attaches importance not only to the zoom ratio but also to the performance and size in the case of a lens-integrated single lens reflex camera.

In each of the embodiments described below, a high-performance multi-focus camera is integrated with a lens-incorporated single lens reflex camera. By so doing, each of the embodiments is intended to provide a lens barrel which is incorporated in a single lens reflex camera, which has performance comparable to that of a camera made up of a camera body and three single-focus lenses, and which is small in size and easy to use.

The subject matter of the present invention will become more apparent by looking at the following detailed description of the specific embodiments of the present invention.
(First Embodiment)

Figure 3A:
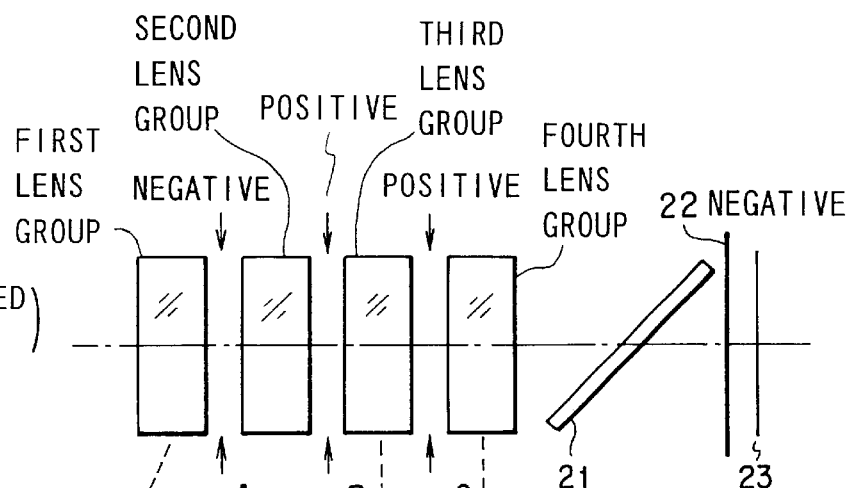
FIGS. 3A to 3D schematically show a "three-focus type" lens system which is according to the first embodiment of the present invention and which comprises four lens groups, FIG. 3A showing how the lens system is when it is in the retreated state, FIG. 3B showing how the lens system is when it is in the wide-angle state, FIG. 3C showing how the lens system is when it is in the standard state, and FIG. 3D showing how the lens system is when it is in the telephoto state.

As the first embodiment of the present invention, FIGS. 3A to 3D show a three-focus type optical system. What is shown in FIG. 3A is a lens system made up of four lens groups (first to fourth groups) and being in the retracted state. In order to optimally project an image on an image plane 23 located behind a focal plane shutter 22 by means of a quick return mirror 21, the first lens group has a negative lens power, the second lens group has a positive lens power, the third lens group has a positive lens power, and the fourth lens group has a negative lens power.

Each of these lens groups may include a number of lenses; alternatively, it may be composed of only one lens.

In the lens structure of the first embodiment, diaphragm units A–C are arranged at positions indicated by arrows. All diaphragm units A–C are in the open state when the zoom lens is in the retracted state. In each of the diaphragm units A–C, the aperture is defined or controlled by a number of blades.

The focal length of the lens system is varied by changing the positions of the lens groups, in such a manner that one of the wide-angle (WIDE) mode, the standard (STAND) mode, and the telephoto mode (TELE) is selected.

Figure 3B:
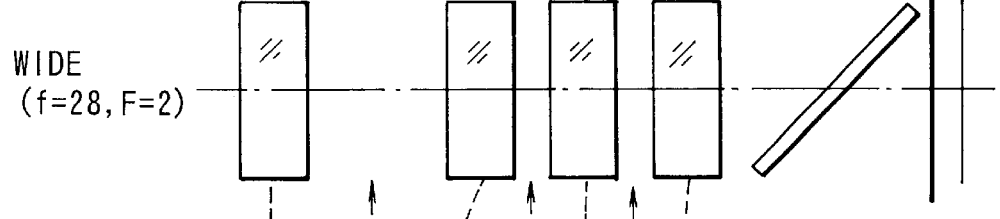

What is shown in FIG. 3B is a lens system which is in the wide-angle state. The focal length f of the lens system is 20 mm, and the diaphragm setting (i.e., focal number) is F2. In the lens system, the distance between first and second lens groups is longer than the distances between the other lens groups. The first lens group, closest to an object to be shot, has a negative lens power, while the other lens groups provide a positive lens power as a whole (the second, third and fourth have positive, positive and negative powers, respectively.) This lens arrangement is generally referred to as a "retro focus type" and is suitable for use as a wide-angle system. Of the three diaphragm units A–C, diaphragm unit A is in the driven state, and the other diaphragm units B and C are not driven and left open.

Figure 3C:
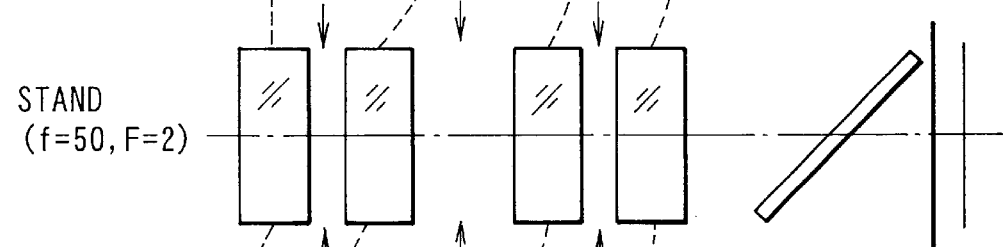

What is shown in FIG. 3C is a lens system which is in the standard state. The focal length f of the lens system is 50 mm, and the diaphragm setting (i.e., focal number) is F2. In the lens system, the distance between first and second lens groups and the distance between the third and fourth lens groups are short, while the distance between the second and third lens groups is long. In this state, the lens groups located in front of the diaphragm unit B have negative and positive powers, respectively, while the lens groups located behind the diaphragm unit B have positive and negative powers, respectively. This lens arrangement provides an arrangement symmetric with reference to the diaphragm B.

The lens arrangement shown in FIG. 3C is suitable for use as a standard-state system. Of the three diaphragm units A–C, only diaphragm unit A is in the driven state.

Figure 3D:
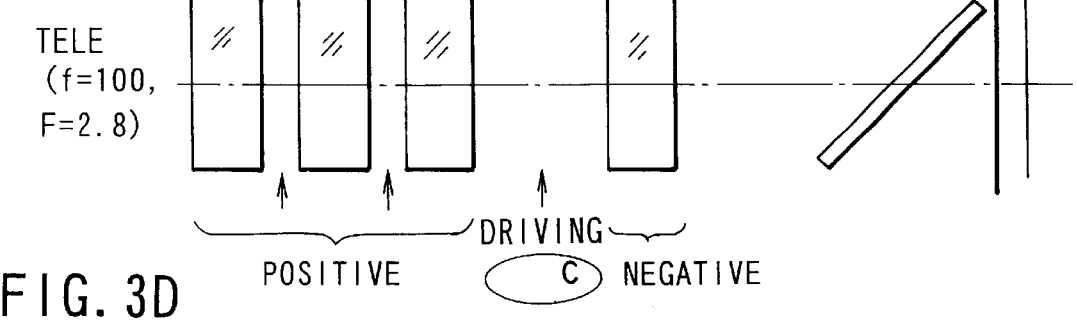

What is shown in FIG. 3D is a lens system which is in the telephoto state. The focal length f of the lens system is 100 mm, and the diaphragm setting (i.e., focal number) is F2. In the lens system, the distance between first and second lens groups and the distance between the second and third lens groups are short, while the distance between the third and fourth lens groups is long. In this state, the first, second and third lens groups provide a positive lens power as a whole (the first, second and third lens groups have positive, positive and negative powers, respectively), while the fourth lens group has a negative power. of the three diaphragm units A–C, only diaphragm unit C is in the driven state. The lens arrangement shown in FIG. 3D is suitable for use as a telephoto system.

In the conventional zoom optical system, the diaphragm units are fixedly arranged between related lens groups. With this structure, it is not easy to provide high performance in all focus areas. In sharp contrast to this, the diaphragm units are variable in position in the embodiment. With this structure, the zoom lens attains high performance though it is small in size and employs a small number of lenses.

The retracted state shown in FIG. 1A as a perspective view corresponds to the state depicted in FIG. 3A. Likewise, the state shown in FIG. 1B corresponds to that shown in FIG. 3D.

Figure 4:
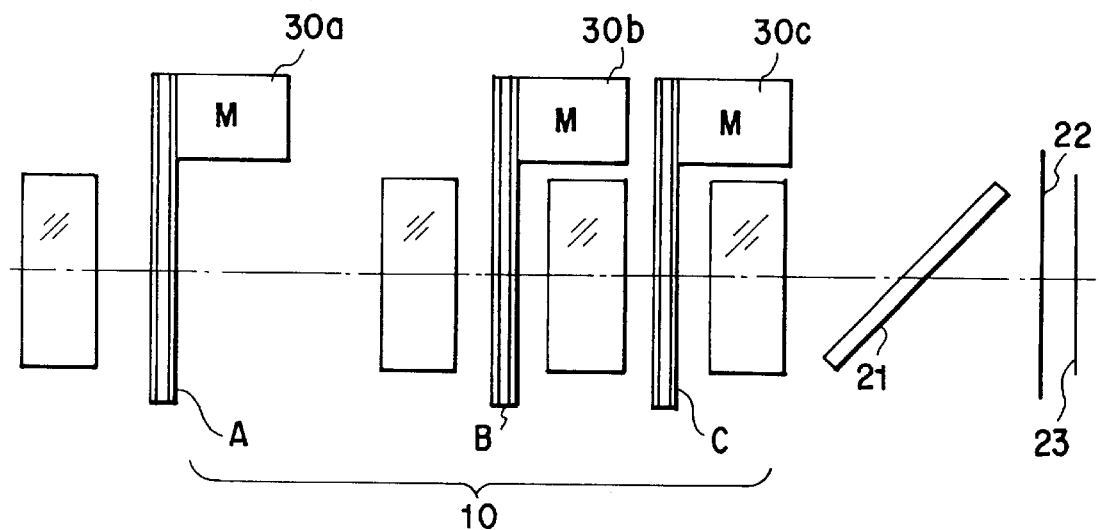
FIG. 4 is a schematic illustration of a photographing lens system incorporating a plurality of diaphragm units.

FIG. 4 is a schematic illustration of a photographing lens system incorporating three diaphragm units. In the system shown in FIG. 4, four lens groups are combined with three diaphragm units A–C in such a manner as to constitute a photographing lens system. The diaphragm units A–C are provided independently of one another and arranged orthogonal to the optical axis. The diaphragm units are driven by respective stepping motors 30a–30c to control their apertures. After being restricted by one of the diaphragm units A–C, a desired amount of light is incident on a quick turn mirror 21 or a focal plane shutter 22 and an image plane 23.

Figure 5:
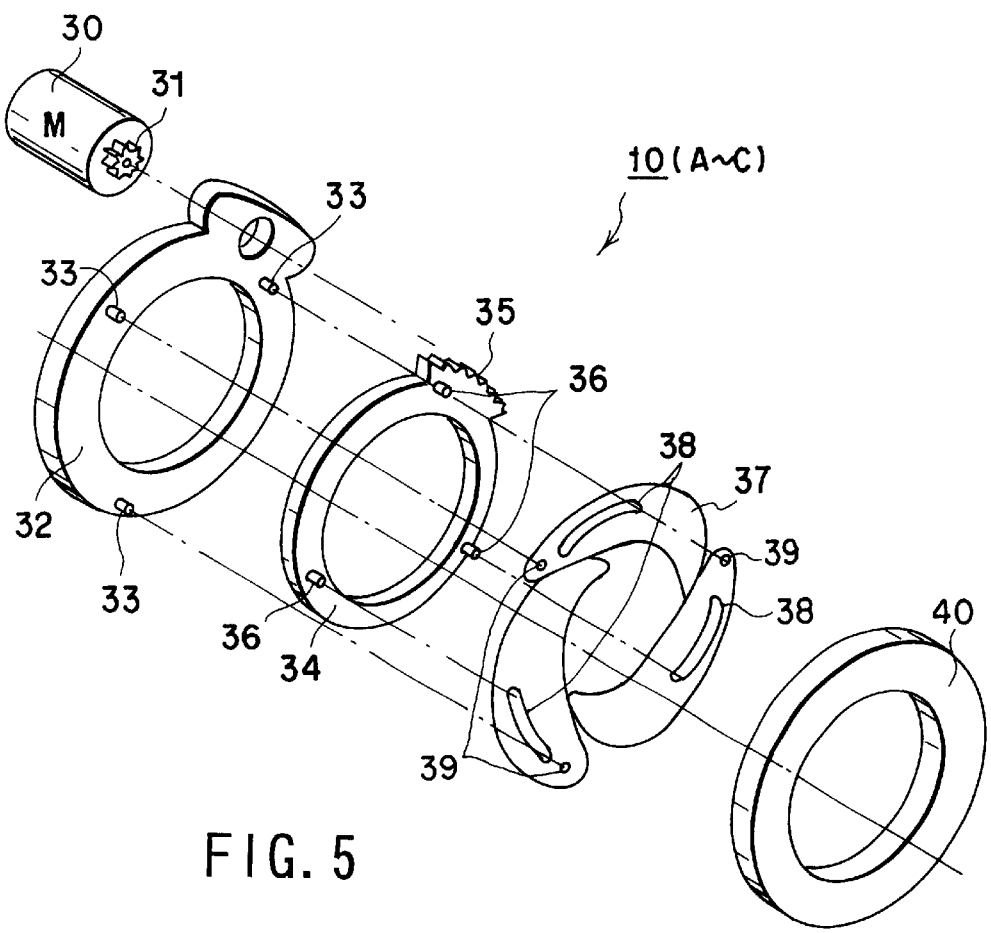
FIG. 5 is a perspective exploded view showing the structure of a diaphragm unit.

FIG. 5 shows how a number of blades and other structural members of a diaphragm unit are assembled together. A stepping motor M, serving as the driving source 30 of the diaphragm unit, has a pinion 31 on its rotating shaft 31. The diaphragm unit is made up of: a diaphragm base plate 32 having a through hole into which the pinion 31 is inserted; a driving ring 34 having a gear portion provided on the circumference thereof and being mesh with the pinion 31; three diaphragm blades (diaphragm sectors) 37; and a diaphragm lid 40, adjacent to the diaphragm blades 37, for protecting them from damage. These structural elements of the diaphragm unit are assembled together, thus forming one diaphragm unit 10.

The diaphragm base plate 32 has three bosses (pins) 33 projected from one side. Likewise, the driving ring 34 has three bosses (pins) 36 projected from one side. Each of the three diaphragm blades 37 has an elongated guide (guide groove) 38 and a support hole 39. The bosses (pins) 33 are fitted into the support holes 39 of the diaphragm blades 37, respectively.

When the driving ring 34 is rotated, with its gear portion in engagement with the pinion 31 of the stepping motor M, the three diaphragm blades 37 gradually move closer to, or away from one another in the direction of the optical axis, with their support holes 39 as a center. In accordance with this movement, the aperture defined by the diaphragm blades 37 is changed in size.

Figure 6A:
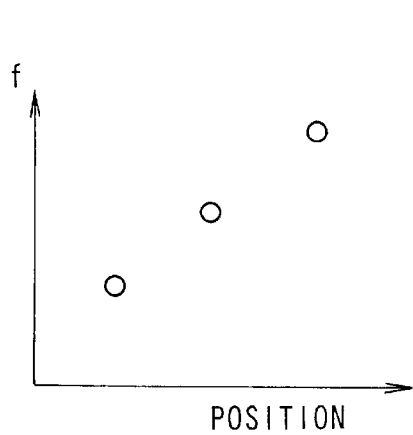
FIGS. 6A and 6B show relationships between the focal distance and extended position of a lens, FIG. 6A being a graph showing the case of a fixed lens of a three-focus switching type, and FIG. 6B being a graph showing the case of a zoom lens of a three-focus switching type.
Figure 6B:
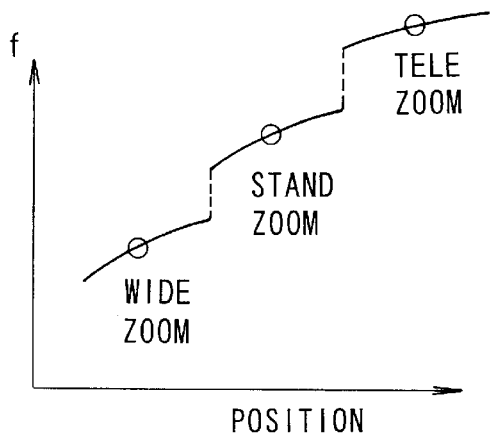

FIGS. 6A and 6B are graphs showing relationships between the focal distance f and the position to which the lens is extended. The graph in FIG. 6A shows the case of a fixed lens of a three-focus switching type, which enables the focal distance f to be switched among three fixed wide-angle, standard and telephoto positions. This type of fixed lens can be obtained, for example, by providing the three diaphragm units A–C shown in FIG. 4 with functions corresponding to the wide-angle, standard and telephoto modes.

The graph in FIG. 6B shows the case of a photographing lens to which the zoom function is added. The photographing lens enables the focal distance f to be switched among three fixed wide-angle, standard and telephoto positions, and further enables the focal distance f to be continuously varied with the three positions as center positions. As can be seen from this, not only the functions corresponding to the wide-angle, standard and telephoto modes are attained, but also a zoom function is attained by means of a lens driving system (not shown).

Figure 7:
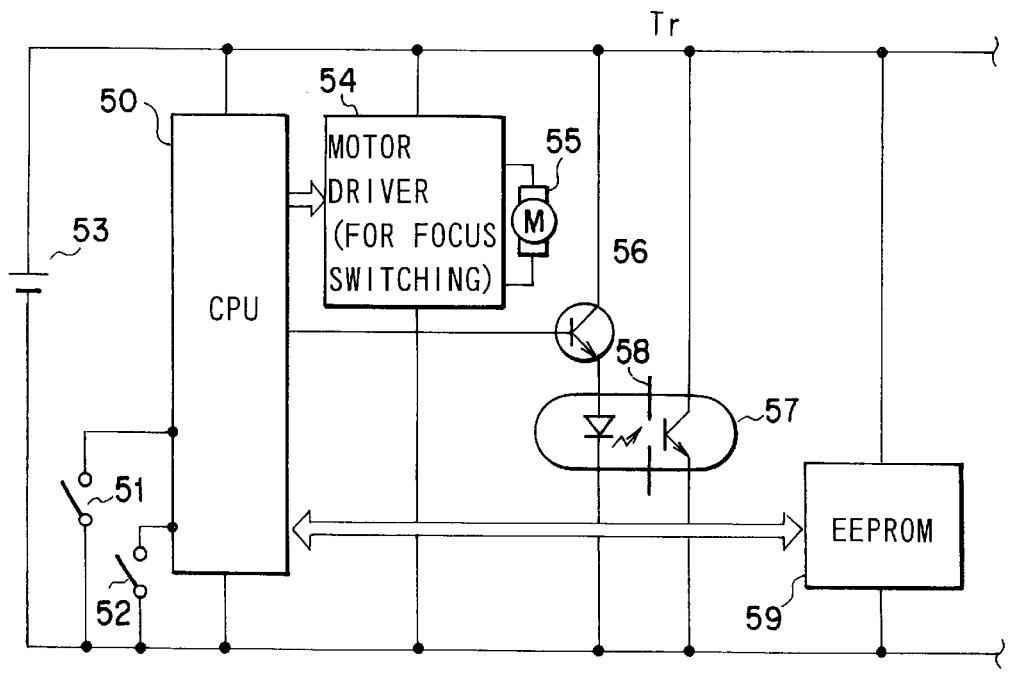
FIG. 7 is an electric circuit block diagram of a camera according to the present invention.

FIG. 7 is a block circuit diagram showing the electric connections among the major structural components related to the subject matter of the present invention. Referring to FIG. 7, a CPU 50 used for controlling the camera of the present invention is connected to two switches. One of the switches is a main switch 51 by means of which power supply is turned on or off. The other switch is a focus changing switch 52 used for selectively changing the focal distance. In the electric circuit shown in FIG. 7, the focus switching operation is executed by use of only one switch. In other words, the focus changing switch 52 is the only switch operated by the user. Each time the focus changing switch is operated by the user, one of the predetermined focal distances is selected in an cyclic order.

A motor driver 54 is connected to the CPU 50. This motor driver 54 rotates a focus switching motor 55 (i.e., a stepping motor M) in a reversible manner. The focus switching motor 55 serves as a driving force for driving a focus switching mechanism, such as a cam ring.

A transistor 56 for PI drive is connected to the CPU 50, and this transistor is connected to a focus detection PI 57 to drive it. The focus detection PI 57 is a device for sensing a focus switch position (not shown). For example, the focus detection PI 57 senses the degree to which the cam ring rotates, so as to detect the focal length of the lens system.

A pulse generating disk 58 is provided for the focus detection PI 57. This disk is rotated in accordance with the rotation of the cam ring. To generate pulses from the PI 57, the disk 58 has light transmission holes and light shielding portions which are alternately arranged in the rotating direction.

An EEPROM 59 is connected to the CPU 50. The EEPROM 59 stores data on the present focal distance of the lens in a rewritable fashion. The EEPROM 59 also stores data representing the relationships between the number of pulses and the focal length in a rewritable fashion. Further, the EEPROM 59 stores data representing the rotating direction of the motor M in a rewritable manner, so as to enable the focal length switching.

Figure 8:
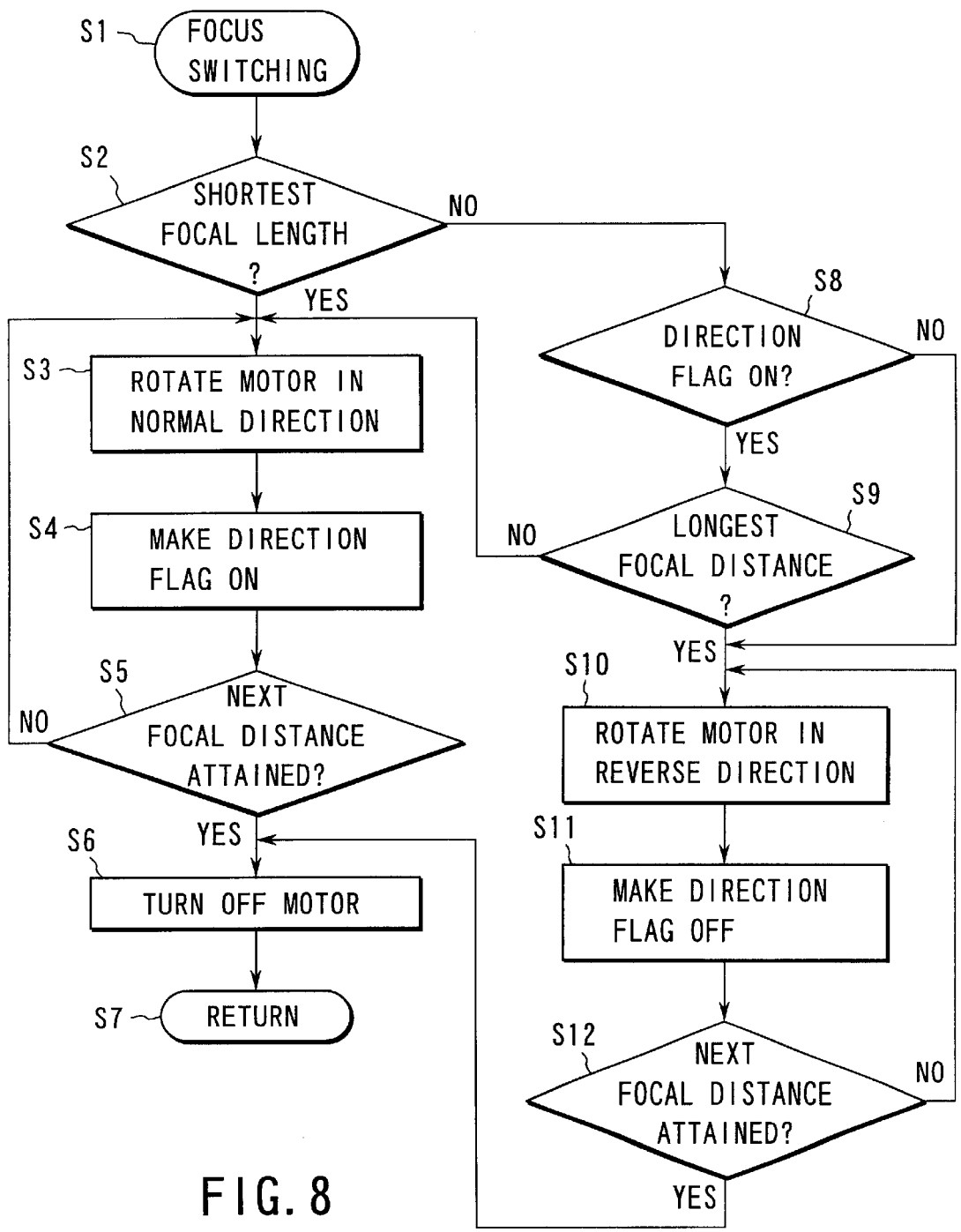
FIG. 8 is a flowchart showing a focus switching subroutine used for the control of the camera of the present invention.

A description will now be given of the control performed when the lens barrel of the present invention is applied to a camera. FIG. 8 illustrates a focus switching subroutine used for controlling the lens barrel. When the focus changing switch is depressed, the main routine of a camera sequence (not sown) advances to step S1 to the focus switching subroutine.

In step S2 of the focus switching subroutine, determination is made based on the data in the EEPROM 59 as to whether or not the present focal distance of the lens is shortest. If the preset focal distance is a distance intermediate between the longest distance and the shortest distance, then the flow jumps to step S8. If the present focal distance is determined as the shortest distance, step S3 is executed to rotate the motor in such a direction as to lengthen the focal distance. In this case, the motor is rotated in the normal direction. This rotating direction of the motor is stored in the EEPROM 59 by making the direction flag ON in step S4 (a high-level latch signal is stored).

In step S5, determination is made based on both the data in the EEPROM 59 and the number of pulses detected, as to whether or not the next focal distance has been attained. If the next focal distance has not yet been attained, the flow returns to step S3 so as to keep the motor rotating in the normal direction. If the next focal distance has been attained, the motor is turned off (S6), and the flow returns to the main routine (S7).

In step S8, a check is made to see whether the direction flag is ON or OFF. If the last focus switching is from a short focus to a long focus, then the direction flag must be ON in step S8. In this case, a check is made in step S9 to see whether the present focal length of the lens is longest or not. If the present focal length is not longest, the flow returns to step S3, in which the lens is driven in such a manner as to lengthen the focal distance.

If the direction flag is OFF in step S8, this means that the last focus switching is from a long focus to a short focus. If the lens has the longest focal distance then, the motor is driven in the reverse direction in Step S10 so as to shorten the focal distance of the lens. Data representing this reverse-direction rotation is recorded in the EEPROM by making the direction flag OFF in step S11 (a low-level latch signal is stored).

Next, a check is made to see in step S12 whether the intended short focal distance has been attained. If it has not yet been attained, the flow returns to step S10, so as to further rotate the motor in the reverse direction. If the intended short distance has already been attained, the flow advances to step S6. In this step, the motor is turned off, and the processing returns to the main routine.

With the control procedures shown in the flowchart in FIG. 8 being followed, the lens is switched is focal distance in a cyclic manner by operating only one button.

(Modification 1)

Although the focal length is changed by means of a single switch in the first embodiment, two switches may be provided, if so desired. Where two switches are employed, one of them is used for shortening the focal length for wide-angle photography, and the other for lengthening the focal length for telephoto photography. This two-switch structure is the mainstream of the present zoom camera technology.

(Advantage 1)

As described above, according to the first embodiment, mechanical diaphragm units driven by actuators (motors) are arranged between the lenses of a lens barrel, and a desired diaphragm unit is selected in accordance with the focal distance switching. With this feature, the lens system can be adjusted in accordance with the focal distance. In comparison with the conventional lens barrel wherein a single diaphragm unit is arranged at a fixed position, the lens barrel according of the first embodiment is light in weight and small in size, and yet it has performance as high as that of a single-focus lens.

(Second Embodiment)

As a second embodiment of the present invention, a description will be given of a two-focus type lens system wherein two focal distances can be switched from one to the other. FIGS. 9A, 9B, 10A and 10B will be referred to in connection with the second embodiment.

FIGS. 9A and 9B show a "two-focus type" photographing lens which is according to the second embodiment of the present invention and which comprises three lens groups and two diaphragm units arranged at different positions between the lens groups. The diaphragm units are specifically unit A which is closer to an object to be photographed and diaphragm unit B which is farther from the object.

FIG. 9A shows a lens system in the wide-angle state. The focal length f of the lens system is 40 mm, and the diaphragm setting (i.e., focal number) thereof is F2, for example. In the state shown in FIG. 9A, diaphragm unit B, arranged at the rear position, is driven. To be more specific, the diaphragm unit B located behind the second lens group is driven by a motor M, with a motor driver operating on the basis of an instruction supplied from a CPU. The lens groups located in front of the diaphragm unit B provide a positive lens power as a whole (the first and second lens groups have positive and negative powers, respectively), while the lens group located behind the diaphragm unit B has a positive lens power.

FIG. 9B shows a lens system in the telephoto state. The focal length f of the lens system is 100 mm, and the diaphragm setting (i.e., focal number) thereof is F2.8, for example. In the state shown in FIG. 9B, diaphragm unit A, arranged at the front position, is driven. To be more specific, the diaphragm unit A located behind the first lens group is driven by the motor M, with the motor driver operating on the basis of an instruction supplied from the CPU. The lens group located in front of the diaphragm unit A has a positive lens power, while the lens groups located behind the diaphragm unit A provide a negative lens power as a whole (the second and third lens groups have negative and positive powers, respectively).

FIGS. 10A and 10B show another "two-focus type" photographing lens which is according to the second embodiment of the present invention and which comprises three lens groups and two diaphragm units arranged at different positions between the lens groups.

FIG. 10A shows a lens system in the wide-angle state, wherein diaphragm unit A, arranged at the front position, is driven. To be more specific, the diaphragm unit A located behind the first lens group is driven by the motor M, with the motor driver operating on the basis of an instruction supplied from the CPU. The lens group located in front of the diaphragm unit A has a negative lens power, while the lens groups located behind the diaphragm unit A provide a positive lens power as a whole (the second and third lens groups have positive and negative powers, respectively).

FIG. 10B shows a lens system in the telephoto state, wherein diaphragm unit B, arranged at the rear position, is driven. To be more specific, the diaphragm unit B located behind the second lens group is driven by the motor M, with the motor driver operating on the basis of an instruction supplied from the CPU. The lens groups located in front of the diaphragm unit B provide a positive lens power as a whole, while the lens group located behind the diaphragm unit B has a negative lens power.

(Modification 2)

Figure 11:
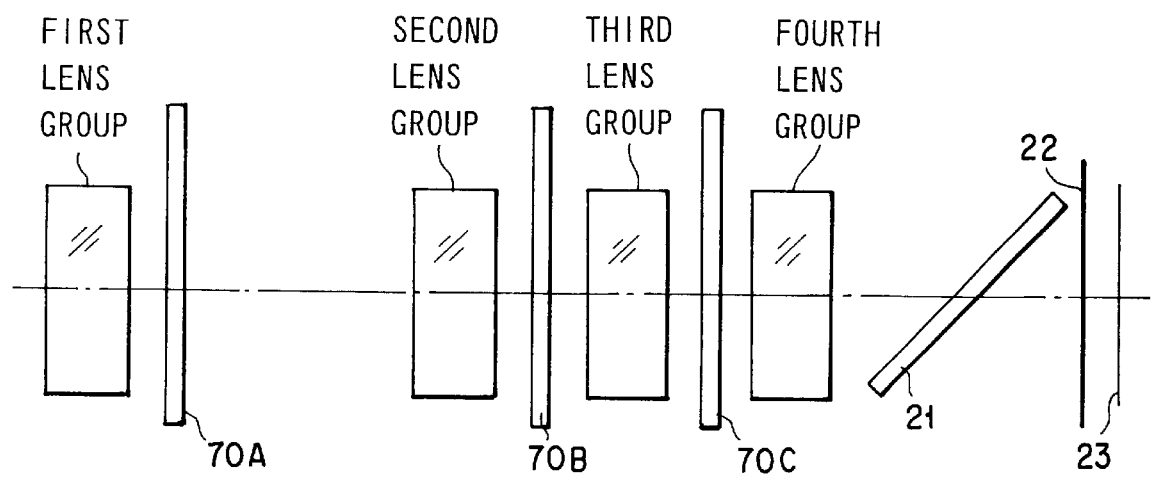
FIG. 11 shows a modified lens system employing a liquid-crystal diaphragm.

FIG. 11 shows a lens system obtained by modifying the first and second embodiments described above. The lens system shown in FIG. 2 differs from the foregoing lens systems in that it employs liquid-crystal diaphragms in place of mechanical ones. To be more specific, the diaphragm units of the foregoing embodiments comprises blades that are mechanically driven by a motor. In contrast, the diaphragm units of the lens system shown in FIG. 11 are electro-optic elements that utilize the light-shielding characteristics of liquid crystals. The liquid-crystal diaphragm units, which are circular and are optically transparent when no power is applied thereto, are arranged at different positions (at three positions in the case of FIG. 11). As shown in FIG. 11, liquid-crystal diaphragm unit 70A is arranged behind the first lens group, liquid-crystal diaphragm unit 70B is arranged between the second and third lens groups, and liquid-crystal diaphragm unit 70C is arranged between the third and fourth lens groups. As can be seen from this, the lens system shown in FIG. 11 is a three-focus type comprising four groups of lenses.

Figure 12:
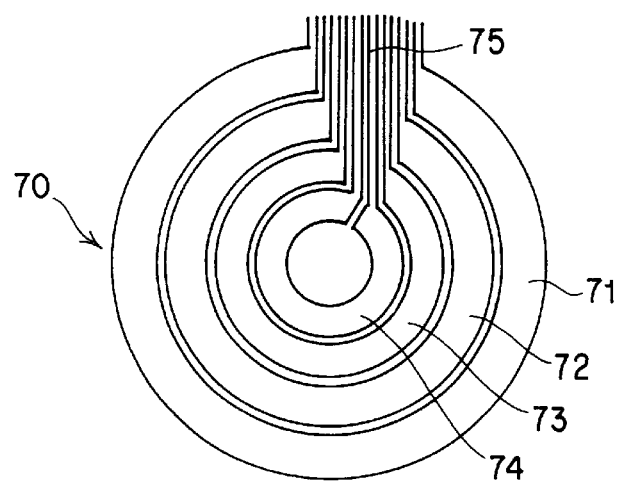
FIG. 12 is a front view showing the liquid-crystal diaphragm of a diaphragm unit.

FIG. 12 shows detailed structures of a liquid-crystal diaphragm unit. The liquid-crystal diaphragm unit 70 shields light when power is applied thereto. The diaphragm unit 70 has a concentric light shielding pattern. In other words, it is made up of concentric diaphragm rings 71, 72, 73 and 74 (which are numbered in this order from the outermost one). The terminals of the diaphragm rings 71–74 are collected at the region indicated by numeral 75 in FIG. 12, and are connected to a device (not shown) by which the diaphragm rings 71–74 are selectively switched on for the control of light-shielding characteristics.

The light shielding characteristics of the liquid-crystal diaphragm unit are controlled by selectively supplying a current to the diaphragm rings 71–74. The size of each diaphragm ring is determined in accordance with the apertures required of the diaphragm unit. When the largest aperture is desired, a current is not supplied to any of the diaphragm rings 71–74. A current is supplied only to the outermost ring 71 when the second largest aperture is desired, to both rings 71 and 72 when the aperture must be reduced from the second largest aperture, to rings 71, 72 and 73 when the aperture must be further reduced, and to all rings 71, 72, 73 and 74 when the aperture must be smallest. In this manner, the liquid-crystal diaphragm unit is controlled to have a desired aperture by selectively supplying a current to the liquid-crystal ring elements corresponding to the mechanical diaphragm blades.

(Advantage 2)

According to the second embodiment, electrically-driven diaphragm units are arranged at different positions between the lenses of the lens unit. The diaphragm units may be either mechanical elements or electro-optic elements, as described above. One of the diaphragm units is selected and driven at the time of focal length switching, so that the lens system is suited for the selected focal length. In comparison with the conventional lens barrel wherein a single diaphragm unit is arranged at a fixed position, the lens barrel of the second embodiment is light in weight and small in size, and yet it has performance as high as that of a single-focus lens. In addition, the lens barrel of the second embodiment does not have to employ such actuators as are shown in FIG. 4, i.e., the actuators used exclusively for driving the mechanical elements. Moreover, the lens barrel of the second embodiment is smaller and lighter than that of the first embodiment.

(Third Embodiment)

Figure 13:
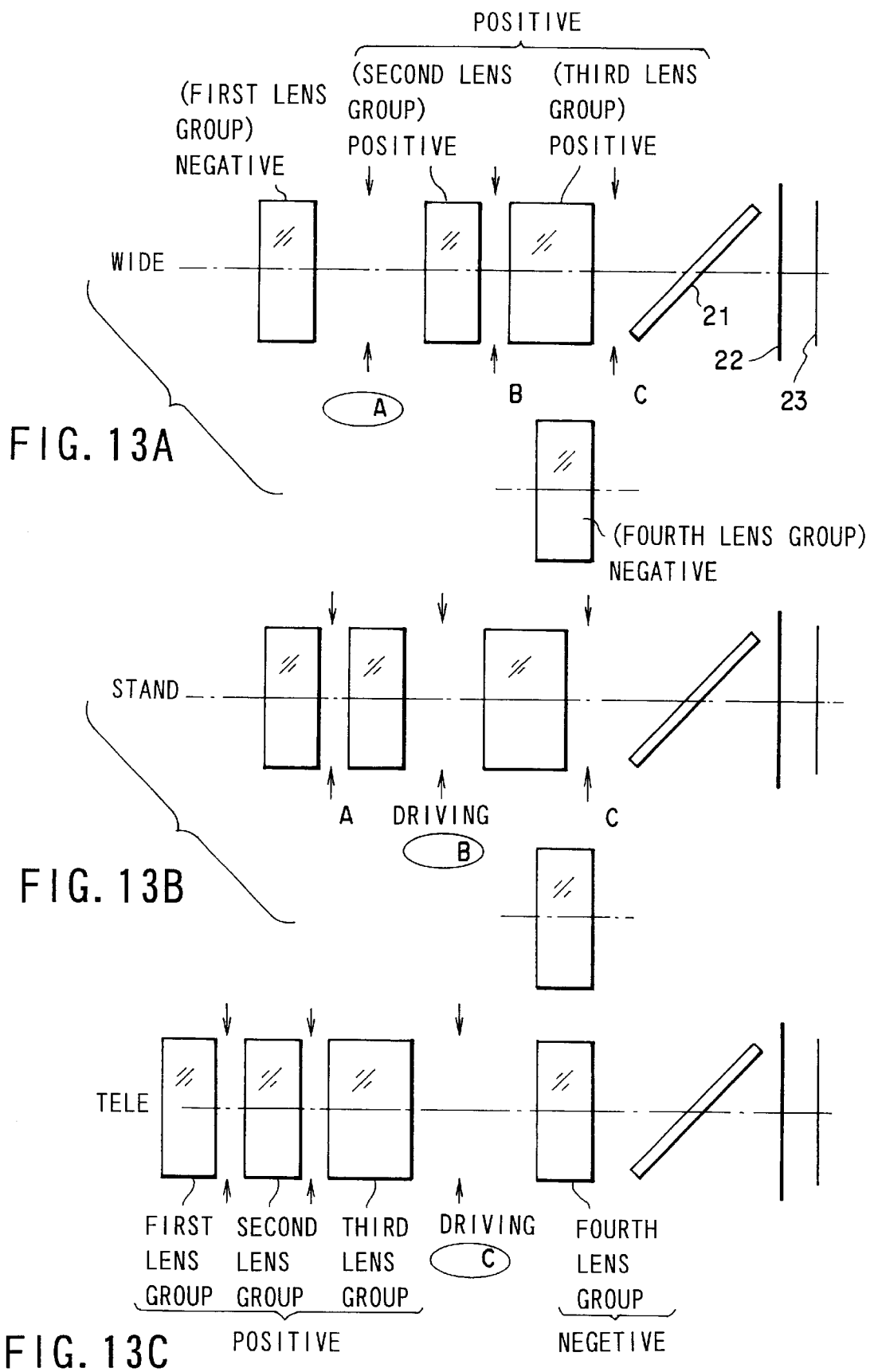
FIGS. 13A to 13C schematically show a three-focus type lens system which is according to the third embodiment of the present invention and which comprises three lens groups, FIG. 13A showing how the lens system is when it is in the wide-angle state, FIG. 13A showing how the lens system is when it is in the standard state, and FIG. 13C showing how the lens system is when it is in the telephoto state.

FIGS. 13A to 13C schematically show a three-focus type lens system which is according to the third embodiment of the present invention and which comprises three lens groups. The lens system is featured in that it comprises an optical element that can be inserted or retreated therefrom. If this optical system is called a fourth lens group, then the system of the third embodiment can be regarded as being a four-lens-group system, wherein the first to third lens groups are in the optical path of the system at all times, and the fourth lens group is inserted in that optical path only when necessary (the fourth lens group is kept away from the optical path when the system is not in the telephoto mode).

FIG. 13A shows the wide-angle state of the lens system. In this state, the diaphragm unit A arranged behind the first lens group is selected for use on the basis of an instruction supplied from the CPU. The lens group in front of the diaphragm unit A has a negative lens power, while the second and third lens groups behind the diaphragm unit A have positive lens powers and naturally provide a positive power as a whole. The fourth lens group is located at a predetermined position away from the optical path.

FIG. 13B shows the standard state of the lens system. In this state, the diaphragm unit B arranged behind the second lens group is selected for use on the basis of an instruction supplied from the CPU. The first and second lens groups in front of the diaphragm unit B have positive lens powers, while the third lens group behind the diaphragm unit B has a negative lens power. In the standard state as well, the fourth lens group is located at the predetermined position away from the optical path.

FIG. 13B shows the telephoto state of the lens system. In this state, the fourth lens group is inserted in the optical path at a position and constitutes the rearmost lens group. The diaphragm unit C between the third and fourth lens groups is selected for use on the basis of an instruction supplied from the CPU. The first, second and third lens groups in front of the diaphragm unit C have positive lens powers, while the fourth lens group behind the diaphragm unit C has a negative lens power.

The diaphragm units A–C employed in the third embodiment may be either mechanical elements or electro-optic elements (e.g., the liquid-crystal types).

(Modification 3)

In FIGS. 13A and 13B, the fourth lens group is shown as being retreated to the position lower than the optical axis, but this is for the sake of expedience. In other words, the retreat position can be determined arbitrarily at the time of design. In the case of the single lens reflex camera shown in FIGS. 1A and 1B, for example, the fourth lens group can be retreated to the region which is ahead of the strobe section adjacent to the pentaprism or to the region on one side of the photographic lens. In this manner, it is possible to make good use of the space inside the camera body, and the camera can be designed to be small in size.

(Advantage 3)

According to the fourth embodiment, the fourth lens group, one of the four lens groups, is inserted in the optical path only when the camera is in the telephoto mode. With this structure, a higher degree of optical freedom is ensured in the telephoto and standard modes. In addition, the focal length in the telephoto mode is greater in the third embodiment than in the first embodiment. Moreover, since the lens group is away from the optical axis, the lens barrel can be designed to be as short as possible.

(Fourth Embodiment)

FIG. 14 schematically shows a photographing lens system which is according to the fourth embodiment of the present invention and which incorporates a plurality of diaphragm units, e.g., three diaphragm units.

The photographing lens system shown in FIG. 14 comprises four lens groups and three diaphragm units A–C. Each of the diaphragm units A–C are located between the lens groups and arranged orthogonal to the optical axis. A ring rotating portion 35 projects from the circumference of each diaphragm unit. Each diaphragm unit is opened or closed by moving the ring-rotating portion 35 in the circumferential direction. When the photographing lens is in use, one of the diaphragm units is driven in accordance with the operating state, and the remaining two diaphragm units remain stationary. A desired amount of light is incident on a quick turn mirror 21 or a focal plane shutter 22 and an image plane 23.

FIG. 15A is a perspective exploded view showing the structure of a diaphragm unit, and FIG. 15B is a front view of the diaphragm unit in the assembled state.

As shown in FIG. 15A, each of the diaphragm units A–C is made up of: a diaphragm driving lever 30 used for adjusting the aperture; a diaphragm base plate 32 secured to the lens barrel; a driving ring 34 having a ring rotating portion 35 which is projected from the circumference of the driving ring 34 and a ring urging ring 31 one end of which is connected to the ring rotating portion 32 and the other end of which is in engagement with the diaphragm base plate 32; three diaphragm blades (diaphragm sectors) 37; and a diaphragm lid 40, secured to the diaphragm blades 37, for protecting the diaphragm blades 37 and the driving ring 34. These structural elements are assembled together as a diaphragm unit.

The diaphragm base plate 32 has three bosses (pins) 33 projected from one side. Likewise, the driving ring 34 has three bosses (pins) 36 projected from one side. Each of the three diaphragm blades 37 has an elongated guide (guide groove) 38 and a support hole 39. The bosses (pins) 36 are fitted into the support holes 38 of the diaphragm blades 37, respectively. Likewise, the bosses (pins) 33 are fitted into the support holes 39 of the diaphragm blades 37, respectively.

The diaphragm driving lever 30, used for driving the diaphragm unit, is capable of rotating the driving ring 34 in the direction indicated by m in FIG. 15A. When the driving ring 34 is rotated, the three diaphragm blades 37 gradually move closer to, or away from one another in the direction of the optical axis, with their support holes 39 as a center. In accordance with this movement, the aperture defined by the diaphragm blades 37 is changed in size.

FIG. 15B shows how an assembled diaphragm unit operates. The diaphragm driving lever 30 moves the ring rotating portion 35 in such a manner that the diaphragm blades 37, normally kept in the open state by the ring urging spring 31, move and narrow the aperture defined by them. The diaphragm rotating lever 30 is driven by a diaphragm motor (not shown) arranged inside the camera body and is rotatable in the direction indicated by arrow m. In accordance with the rotation, the diaphragm rotating lever 30 pushes the ring rotating portion 35 projected from the driving ring 34, so that the diaphragm blades 37 move in such a manner as to narrow the aperture defined by them. When this operation is performed, the rotating angle of the stepping motor may be controlled directly. Alternatively, a detection element (not shown) may be provided for either the diaphragm driving lever 30 or the driving ring 34. The detection element is detected by means of a pulse amount detection mechanism, for feedback control. The pulse amount detection mechanism is realized by a non-contact photo interrupter or the like.

The three diaphragm units A–C shown in FIG. 14 can be designed to have such characteristics as are shown in the graphs of FIGS. 6A and 6B. To be more specific, the diaphragm units A–C may have fixed apertures corresponding to the wide-angle, standard and telephoto modes, respectively, in such a manner that the focal distance f and the position to which the lens is driven along the optical axis have such relationships as are depicted in FIG. 6A. In this case, the photographing lens incorporating the diaphragm units A–C is a fixed lens of a three-focus switching type, which enables the focal distance t to be switched among the three fixed positions. The photographing lens may be a lens to which the zoom function is added. That is, the photographing lens enables the focal distance f to be switched among three fixed wide-angle, standard and telephoto positions, and further enables the focal distance f to be continuously varied with the three positions as center positions.

Another type of diaphragm switching mechanism and a manner in which the diaphragm units are switched thereby will now be described with reference to FIGS. 16A, 16B, 17A and 17B.

Figure 16A:
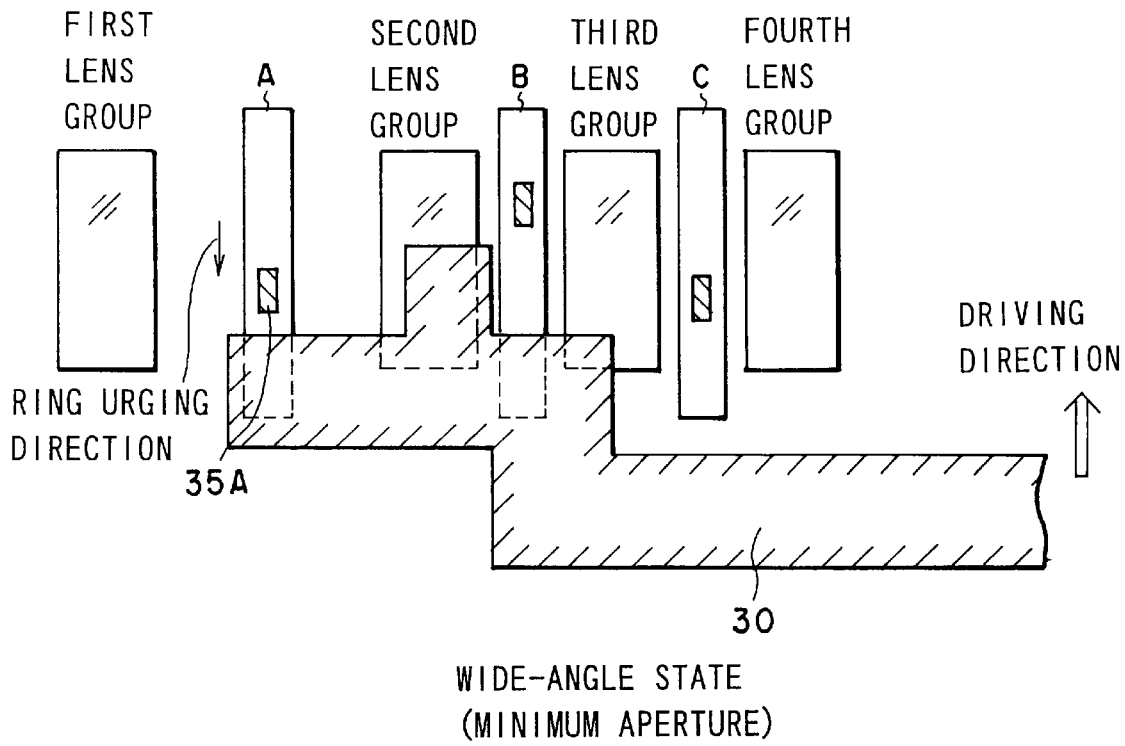
FIGS. 16A and 16B show how the diaphragm unit and diaphragm lever of the present invention are related to each other in the wide-angle mode.
Figure 16B:
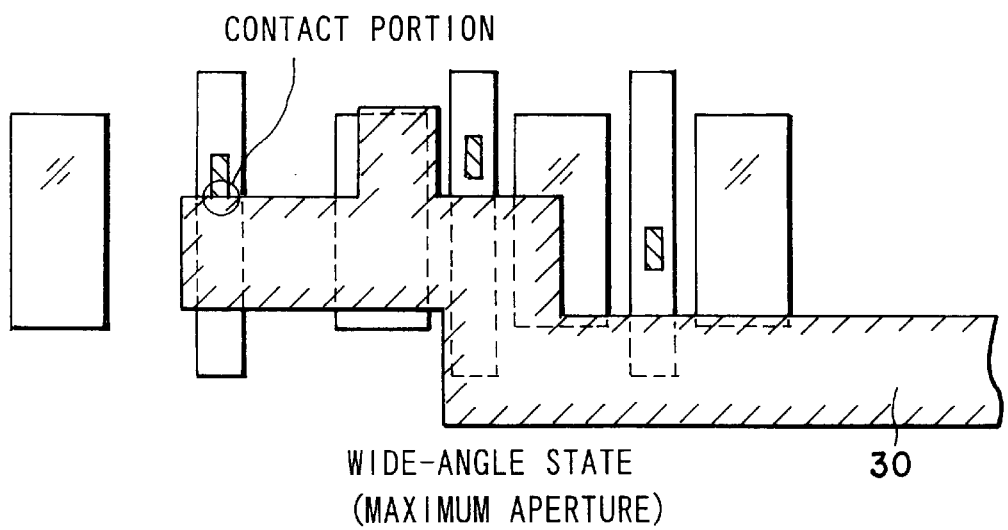

FIGS. 16A and 16B show how the diaphragm unit and diaphragm driving lever are related to each other in the wide-angle mode. In particular, FIG. 16A shows the case where the lens barrel is in the wide-angle mode and the diaphragm units A–C are in the initial state (i.e., the stationary state). The diaphragm units A–C, each having such a structure as depicted in the exploded view in FIG. 15A, are arranged at different positions, respectively. The ring rotating portions of these diaphragm units A–C are different in phase, as shown in FIG. 16A. When, in this state, a diaphragm driving operation is started, the diaphragm driving lever 30 is moved in the driving direction indicated by the arrow in FIG. 16A (i.e., in the direction approaching the ring rotating portion 35A) by the motor (not shown) arranged inside the camera body. In the wide-angle state, only the ring rotating portion 35A of diaphragm unit A touches the distal end portion of the diaphragm driving lever 30. As a result, only diaphragm unit A is driven to narrow its aperture to a desirable degree.

FIG. 17A shows how the diaphragm unit and diaphragm lever of the present invention are related to each other in the standard mode, and FIG. 17B shows how they are related to each other in the telephoto mode.

In the state shown in FIG. 17A, the lens barrel is in the standard mode and the diaphragm units A–C are in the initial state (i.e., the stationary state). When, in this state, a diaphragm driving operation is started, the diaphragm driving lever 30 is moved in the driving direction (i.e., in the direction approaching ring rotating portion 35B) by the motor. In the standard state, only the ring rotating portion 35B of diaphragm unit B touches the projected portion of the diaphragm driving lever 30. As a result, only diaphragm unit B is driven to narrow its aperture to a desirable degree.

Let us assume that the lens is switched from the standard state described above to the telephoto state shown in FIG. 17B. In the state shown in FIG. 17B, the lens barrel is extended and in the standard mode, and the diaphragm units A–C are in the initial state (i.e., the stationary state). When, in this state, a diaphragm driving operation is started, the diaphragm driving lever 30 is moved in the driving direction (i.e., in the direction approaching ring rotating portion 35C) by the motor. In the telephoto state, only the ring rotating portion 35C of diaphragm unit C touches the projected portion of the diaphragm driving lever 30. As a result, only diaphragm unit C is driven to narrow its aperture to a desirable degree.

In this manner, the diaphragm rotating portions of the three diaphragm units can be selectively driven by means of only one diaphragm driving lever 30. In other words, the diaphragm driving lever 30 is shaped in such a manner as to enable the diaphragm rotating portions of different diaphragm units to be selectively driven.

(Advantage 4)

According to the fourth embodiment, a diaphragm driving member can selectively drive the diaphragm units incorporated in the lens system of the lens barrel. Since the driving force from one motor can be transmitted to the ring rotating portion of a desired diaphragm unit, the simple mechanism of the fourth embodiment is very advantageous when it is applied to a single lens reflex camera as a means for switching the focal length among wide-angle, standard and telephoto modes. That is, it is possible to provide a lens barrel which is light in weight and small in size and which has performance as high as that of a single-focus lens.

(Modification 4)

The diaphragm driving lever 30 need not be driven by a motor; it may be manually operated by employing known technology.

In addition, the shape of the diaphragm driving lever 30 is not limited to that shown in FIGS. 17A and 17B. The diaphragm driving member 30 may be designed to have an arbitrary shape as long as it can attain a function equivalent to the above-described function on the basis of the phases and initial positions of the ring rotating portions 35. (The "initial positions" are positions at which the ring rotating portions 35 are located when the diaphragm units are not driven.)

(Fifth Embodiment)

According to the fifth embodiment, a lens-and-diaphragm unit comprising three lens groups and actuator-provided diaphragm units is switchable between the wide-angle mode and the telephoto mode by 180° rotation. To be more specific, a lens group and a diaphragm unit can be changed in position such that their arrangement order is reversed. The lens system of the fifth embodiment is of a two-focus type, and the second lens group is rotated or reversed between the two focus modes.

FIGS. 18A and 18B schematically show a "two-focus type" lens-and-diaphragm unit which is according to the fifth embodiment of the present invention and which comprises three lens groups.

FIG. 18A shows how the lens-and-diaphragm unit is when it is in the wide-angle state. The second lens group and the diaphragm unit adjacent thereto are movable as one body (the lens group and the diaphragm unit are indicated by the broken-line rectangle). In the three-lens arrangement, the first lens group has a positive lens power, the second lens group has a negative lens power, and the third lens group has a positive lens power. Through these lens groups, a light beam is converged either on a quick turn mirror 21 or on a focal plane shutter 22 and an image plane 23.

FIG. 18B is an explanatory view showing how the lens-and-diaphragm unit is when it has bee switched from the wide-angle mode to the telephoto mode by 180° rotation. As can be seen from FIG. 18B, the second lens group and the adjacent diaphragm unit are driven in one body and reversed in the arrangement order as viewed in the direction of the optical axis. In the state shown in FIG. 18B, the first lens group has a positive lens power as in the state shown in FIG. 18A, but it is advanced to the frontward position. The reversed second lens group and the third lens group provide a negative lens power as a whole. Through these lens groups, a light beam is converged either on the quick turn mirror 21 or on the focal plane shutter 22 and the image plane 23.

The reversible two-focus lens-and-diaphragm unit will be described in more detail with reference to FIGS. 19A to 19C. The lens-and-diaphragm unit is made up of a diaphragm driven by a stepping motor M, and a lens secured to a frame and serving as the second lens group. The diaphragm and the lens are fabricated as one body. The wide-angle state of the lens-and-diaphragm unit is shown in FIG. 19A. From this state, the lens-and-diaphragm unit is rotated in the direction indicated by arrow m, with a point 0 on the optical axis as a center of rotation. A transitional state from the wide-angle state to the telephoto state is shown in FIG. 19B. After being rotated by 180°, the lens-and-diaphragm unit is set in the telephoto state shown in FIG. 19C.

As described above, the 180° rotation of the lens-and-diaphragm unit can be performed by a variety of means. An example of such means will be described with reference to FIGS. 20A, 20B, and 21A–21C.

Figure 20A:
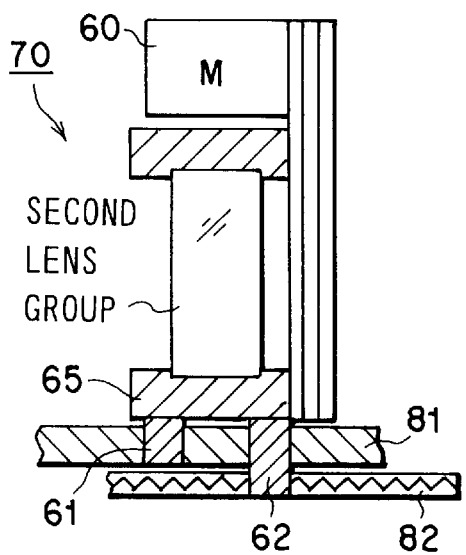
FIGS. 20A and 20B show a lens-and-diaphragm unit which is according to the fifth embodiment of the present invention, FIG. 20A being a sectional view showing the lens-and-diaphragm unit along with a switching mechanism, and FIG. 20B being a perspective view showing the outward appearance of the lens-and-diaphragm unit.
Figure 20B:
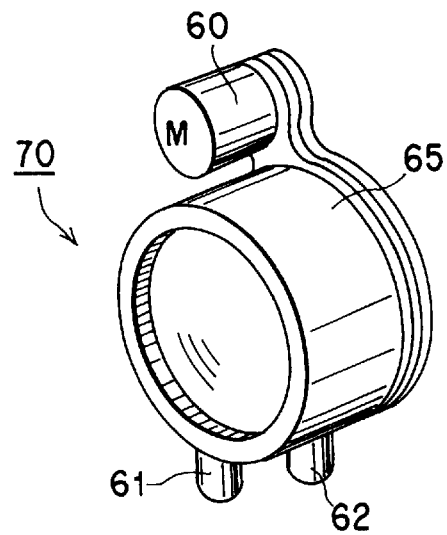

The lens-and-diaphragm unit 70, a sectional view of which is shown in FIG. 20A, looks as indicated in the perspective view shown in FIG. 20B. The lens-and-diaphragm unit 70 comprises: a diaphragm unit; a diaphragm motor M serving as the driving source of the diaphragm unit; a second lens group; and a lens frame 65 within which the second lens group is fitted. Two columnar second-lens-group frame pins A61 and B62 extend downward from the lower portion of the lens frame 65. The frame pins A61 and B62 are projected downward.

Figure 21A:
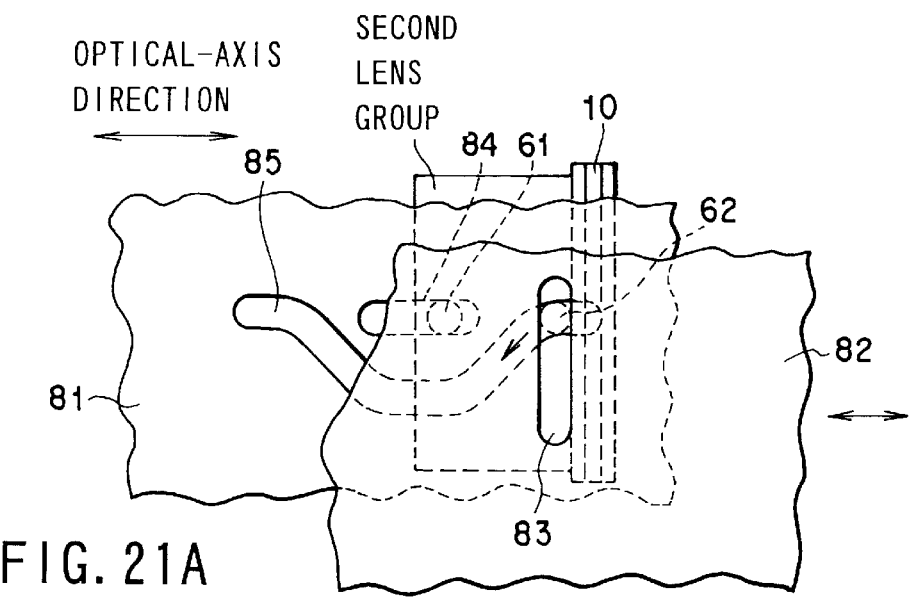
FIGS. 21A to 21C show a cam mechanism for driving the lens-and-diaphragm unit, FIG. 21A being a plan view showing how the cam mechanism is when it is arranged on the optical axis, FIG. 21B being a plan view showing how the cam mechanism is when it is moving the unit, and FIG. 21C being a plan view showing how the cam mechanism is when it has moved the unit to the intended position.
Figure 21B:
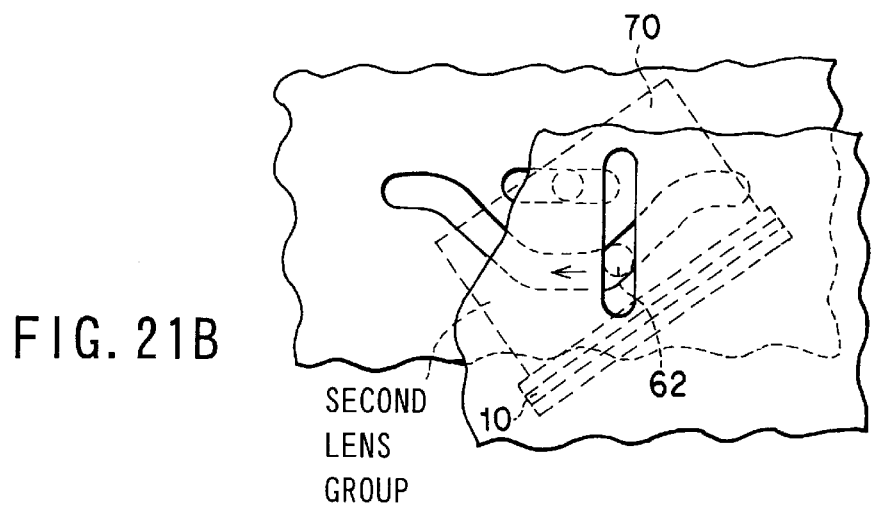
Figure 21C:
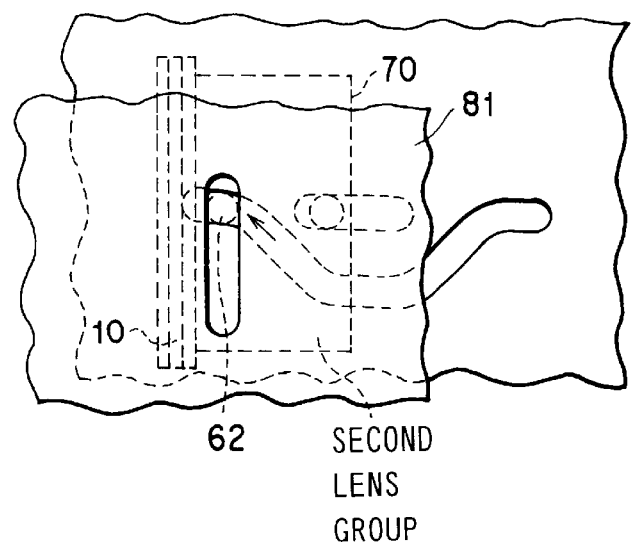

The lens-and-diaphragm unit 70 is slidably supported by both a switching cam 81 and a switching plate 82. The switching cam 81 serves as a means for changing the direction of the unit 70, and the switching plate 82 is located under the switching cam 81. The lens-and-diaphragm unit 70 is coupled to the cam 81 and plate 82 by means of the second-lens-group frame pins A61 and B62. As shown in FIGS. 21A–21C, the cam 81 and the plate 82 jointly constitute a cam mechanism, by which the lens-and-diaphragm unit 70 is reversed. The frame pins A61 and B62 serve as a cam follower. Frame pin A61 is shorter than fame pin B62, and the length of frame pin A61 is nearly equal to the thickness of the switching plate 82. The length of frame pin B62 is nearly equal to the total thickness of the switching cam 81 and plate 82 combined.

As shown in FIG. 21A, the lens-and-diaphragm unit 70 is arranged along the optical axis in the initial state (i.e., the wide-angle state) and is stationary on the cam mechanism.

In the state shown in FIG. 21A, second-lens-group frame pin A61 is movably inserted in a guide groove 84 formed in the switching cam 81, and located substantially at one end of that guide groove 84. Second-lens-group frame pin B62 extends through a guide groove 85 formed in the switching cam 81. The projected portion of frame pin B62 is movably inserted in a guide groove 83 formed in the switching plate 82, and located substantially at one end of that guide groove 83.

The guide grooves 84 and 83 are linear grooves and have predetermined lengths. The former extends in the direction of the optical axis and guides frame pin A61, and the latter extends in the direction perpendicular to the optical axis and guides frame pin B62. To be more specific, the guide groove 84 of the switching cam 81 is elongated in the direction of the optical axis, and the width of the guide groove 84 is substantially equal to the diameter of second-lens-group frame pin A61. This frame pin is slidable in the guide groove 84.

Guide groove 85 is longer than guide groove 84. Guide groove 85, curved at four positions, is made up of a central portion, end portions and intermediate portions. The central portion is away from the guide groove 84 by a predetermined distance and extends in parallel thereto. The end portions are located on extension lines extending from the longitudinal axis of guide groove 84. The intermediate portions connect the central portion and the end portions and extend in directions that intersect with the extension lines at predetermined angles. The width of guide groove 85 is slightly greater than the diameter of the second-lens-group frame pin B62.

If the guide groove 83 formed in the switching cam 82 has a length which is substantially half of the diameter of the unit 70. The guide groove 83 linearly extends in the direction perpendicular to the optical axis, and the width of the guide groove 83 is substantially equal to the diameter of the second-lens-group frame pin B62. This frame pin B62 is slidable in the guide groove 83.

The cam mechanism of the above structure operates as follows. When the switching plate 82, which is adjacent to the switching cam 81 secured to the lens barrel (not shown in FIG. 21A), is moved in the directions indicated in FIG. 21A, the second-lens-group frame pins A61 and B62, which are away from each other by a predetermined distance, are guided along the guide grooves 83, 84 and 85. In accordance with this movement, the lens-and-diaphragm unit 70 is gradually rotated and reversed.

When the switching plate 82 is moved to the left, as viewed in FIG. 21A, the unit 70 rotates clockwise to the intermediate position shown in FIG. 21B. At that intermediate position, the unit 70 is slanted about 45° with respect to the direction of the optical axis. At the time, the second-lens-group frame pins A61 and B62 are located at substantially middle positions of the guide grooves 83–85.

When the switching plate 82 is moved further, the second-lens-group frame pins A61 and B62 are moved to the other end positions of the guide grooves 83–85. As a result, the unit 70 is reversed.

As described above, the switching plate 82 is moved in the direction of the optical axis relative to the switching cam 81. With the switching plate 82 moved in this manner, the second-lens-group frame pins A61 and B62 are guided by the guide grooves 83–85, and the lens-and-diaphragm unit 70 is rotated 180° from the original direction. The direction switching means, which is based on a cam mechanism, can be applied to a lens barrel provided with a power-varying function, for the purpose of focus switching.
(Advantage 5)

According to the fifth embodiment, which is based on substantially the same technical concept as the fourth embodiment, the diaphragm unit is driven between the wide-angle mode and the telephoto mode. When the mode is switched from the wide-angle mode to the telephoto mode, the lens-and-diaphragm unit including the second lens group is rotated 180° by the cam mechanism described above. Since, as a result of the rotation, the diaphragm and the lens are reversed in the arrangement order, the same advantage as described above can be obtained.
(Modification 5-1)

The means for rotating the lens-and-diaphragm unit is not limited to the mechanism described above in relation to the fifth embodiment. That is, the diaphragm unit need not be integral with the second lens group; it may be separate from the second lens group. In the case where the diaphragm unit is separate, it is urged by the second lens group by use of a spring. For switching between the wide-angle mode and the telephoto mode, the diaphragm unit and the second lens group may be designed in such a manner that the positional relationships between them are slightly varied in the direction of the optical axis.

In the fifth embodiment, the lens-and-diaphragm unit is rotated 180° by moving the lens frame (not shown) from the position corresponding to the wide-angle mode to the position corresponding to the telephoto mode. To return to the wide-angle mode, the lens-and-diaphragm unit is rotated 180° in the opposite direction, but this in no way restricts the present invention. The lens-and-diaphragm unit may be designed to be a 360° rotation type. In this case, the lens-and-diaphragm unit is rotated 180° for switching from the wide-angle mode to the telephoto mode, and is further rotated 180° for switching from telephoto mode to the wide-angle mode.
(Modification 5-2)

The means for rotating the lens-and-diaphragm unit may be realized by employing an actuator. A driving system using this actuator will be described, referring mainly to how it is different from the mechanism of the fifth embodiment.

Figure 22A:
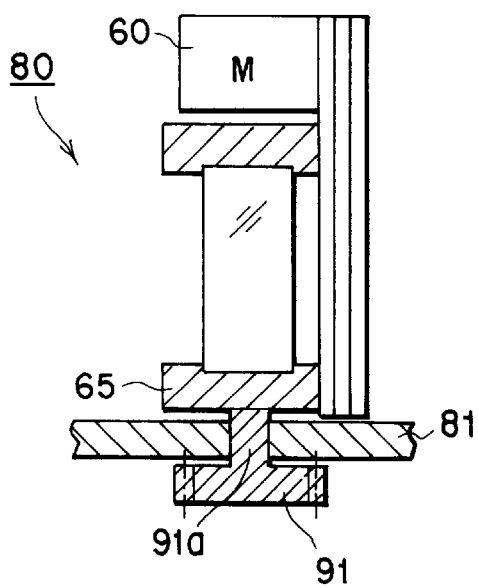
FIGS. 22A and 22B show a lens-and-diaphragm unit which is according to the fifth embodiment of the present invention, FIG. 22A being a sectional view showing the lens-and-diaphragm unit along with a switching mechanism, and FIG. 22B being a perspective view showing the outward appearance of the lens-and-diaphragm unit.
Figure 22B:
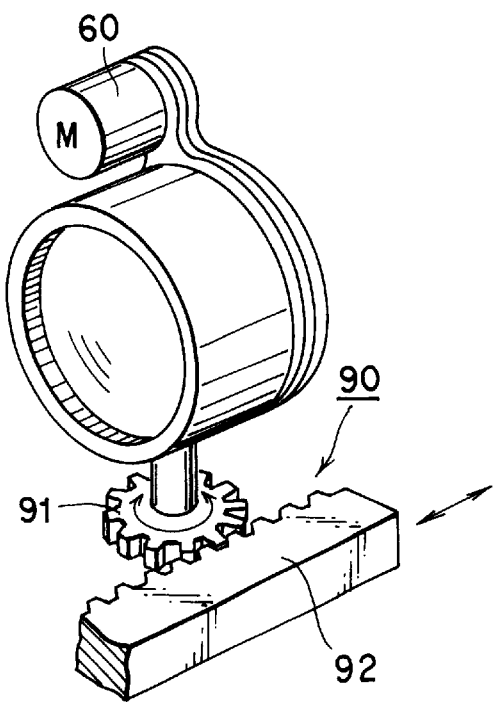

FIGS. 22A and 22B show a lens-and-diaphragm unit 80 according to the second modification of the fifth embodiment. The lens-and-diaphragm unit 80, a sectional view of which is shown in FIG. 22A, looks as indicated in the perspective view shown in FIG. 22B. The lens-and-diaphragm unit 80 comprises: a diaphragm motor M60 serving as the driving source of a diaphragm unit; and a lens frame 65 within which the second lens group is fitted. A columnar shaft 91a extends downward from the lower portion of the lens frame 65, and a pinion 91 serving as a switching gear is fixed to the end of the columnar shaft 91a. The columnar shaft 91a is rotatably inserted in a hole 85 formed in a frame 81.

As shown in FIG. 22B, the pinion 91 is in engagement with the linear teeth section of a switching rack 92, thereby forming a rack & pinion mechanism 90. When the switching rack 92 is moved in the directions indicated by the arrow in FIG. 22B, the lens-and-diaphragm unit 80 is rotated, and is therefore reversed in direction.

The adoption of the rack & pinion mechanism produces the same advantage as those of the fifth embodiment.
(Other Modifications)

The present invention is not limited to the embodiments described above, and can be modified in various manners without departing from the spirit and scope of the invention. For example, the features described above in connection with each embodiment are applicable to cameras of various types, such as a lens-replacement type camera, a simple-structure camera, and a camera with a power-varying function, etc.

The rack & pinion mechanism described above may be replaced with any type of mechanism as long as the above advantages are obtained. Needless to say, it is preferable that the mechanism used in place of the rack & pinion mechanism be easy to operate.

In addition to the above, the present invention can be modified in various ways without departing from the spirit and scope of the present invention.

The present invention has been described, referring to some specific embodiments. The inventions described in the specification include the following:

(1a) a camera that is provided with a photographing optical system made up of at least three lens groups, the camera comprising a plurality of aperture-variable diaphragm means, respectively arranged at different two or more positions between the lens groups, for controlling the amount of light passing through the photographing optical system (2a) a camera that is provided with a photographing optical system whose focal distance can be switched from one to another, the camera having a lens barrel that comprises:

a plurality of diaphragm means, respectively arranged at different positions between the lenses of the photographing optical system, for controlling the amount of light passing through the photographing optical system; and diaphragm switching means for switching between diaphragm means which are then available, in accordance with the focal length switching (3a) a camera that is provided with a photographing optical system whose focal distance can be switched from one to another, the camera having a lens barrel that comprises:

first diaphragm means, arranged at a first inter-lens position of the photographing optical system, for controlling the amount of light passing through the photographing optical system; and second diaphragm means, arranged at a second inter-lens position of the photographing optical system, for controlling the amount of light passing through the photographing optical system (4a) the lens barrel described in (3a), wherein the first and second diaphragm means include diaphragm driving sources operating independently of each other (5a) the lens barrel described in (4a), wherein the diaphragm driving sources are stepping motors (6a) the lens barrel described in (3a), which includes diaphragm switching means for switching between the first and second diaphragm means in accordance with the focal length switching, and in which the photographing optical system provides a first focal distance when the first diaphragm means is driven and provides a second focal distance different from the first focal distance when the second diaphragm means is driven (7a) the lens barrel described in (3a), (4a) or (5a), wherein each of the first and second diaphragm means includes a plurality of diaphragm blades for variably defining an aperture (8a) the lens barrel described in (3a), wherein each of the first and second diaphragm means includes a liquid-crystal diaphragm member which allows passage of different amounts of light between a time when a current is supplied thereto and a time when a current is not supplied thereto The inventions described in the specification also include the following:

(1b) a camera that is provided with a photographing optical system made up of at least three lens groups, the camera comprising a plurality of aperture-variable diaphragm means, respectively arranged at different two or more positions between the lens groups, for controlling the amount of light passing through the photographing optical system, the camera comprising a single driving source for driving the plurality of diaphragm means (2b) a camera that is provided with a photographing optical system whose focal distance can be switched from one to another, the camera comprising diaphragm means, arranged at an inter-lens position of the photographing optical system, for controlling the amount of light passing through the photographing optical system, the diaphragm being switchable between at least two different inter-lens positions of the photographing optical system (3b) a camera that is provided with a photographing optical system whose focal distance can be switched from one to another, the camera comprising:

a plurality of diaphragm means, respectively arranged at different two or more positions between the lens groups, for controlling the amount of light passing through the photographing optical system;

a single driving source for driving the plurality of diaphragm means; and diaphragm driving-switching means for selectively transmitting a force of the single driving source to one of the plurality of diaphragm means in accordance with the focal distance switching (4b) a camera that is provided with a photographing optical system whose focal distance can be switched from one to another, the camera comprising:

first diaphragm means, arranged at a first inter-lens position of the photographing optical system, for controlling the amount of light passing through the photographing optical system;

second diaphragm means, arranged at a second inter-lens position of the photographing optical system, for controlling the amount of light passing through the photographing optical system;

a single driving source for driving the first and second diaphragm means; and diaphragm driving-switching means for selectively transmitting a force of the single driving source to one of the first and second diaphragm means in accordance with the focal distance switching (5b) the camera described in (4b), wherein the single driving source is a stepping motor (6b) the camera described in (4b), which includes diaphragm switching means for switching between the first and second diaphragm means in accordance with the focal length switching, and in which the photographing optical system provides a first focal distance when the first diaphragm means is driven and provides a second focal distance different from the first focal distance when the second diaphragm means is driven (7b) the camera described in (4b) or (5b), wherein each of the first and second diaphragm means includes a plurality of diaphragm blades for variably defining an aperture (8b) a camera that is provided with a photographing optical system whose focal distance is switched from one to another by changing intervals between lens groups of the photographing optical system, the camera comprising:

a first diaphragm mechanism, arranged at a first inter-lens position of the photographing optical system, for controlling the amount of light passing through the photographing optical system;

a second diaphragm mechanism, arranged at a second inter-lens position of the photographing optical system, for controlling the amount of light passing through the photographing optical system;

a diaphragm driving member, engageable with either the first diaphragm mechanism or the second diaphragm mechanism, for driving the diaphragm mechanism it engages to vary an aperture defined thereby; and a single driving source for driving the diaphragm driving member (9b) the camera described in (8b), which further comprises driving-switching means for permitting the diaphragm driving member to selectively engage with the first diaphragm mechanism and the second diaphragm mechanism (10b) the camera described in (9b), wherein the first and second diaphragm mechanisms move in the optical axis direction in accordance with a manner in which the lens groups move at the time of focal length switching (11b) the camera described in (10b), wherein that one of the first and second diaphragm mechanisms which is engageable with the diaphragm driving member changes in accordance with positions to which the first and second diaphragm mechanisms move in the optical axis direction (Advantages of the Invention)

As detailed above, the present invention provides a lens barrel having an optical system which is light in weight and small in size and which has performance as high as that of a single-focus lens. A camera or another photographing device incorporating the lens barrel can be designed to be small in size and light in weight.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A lens barrel comprising:

a photographing optical system including a plurality of lenses;

first diaphragm means, arranged between the lenses of the photographing optical system, for varying a diameter of an aperture defined by said first diaphragm means so as to control an amount of exposure light passing through the photographing optical system used for photographing; and second diaphragm means, also arranged between the lenses of the photographing optical system, for varying a diameter of an aperture defined by said second diaphragm means so as to control an amount of exposure light passing through the photographing optical system used for photographing.

2. A lens barrel according to claim 1, further comprising diaphragm switching means for selecting and driving one of the first and second diaphragm means at a time of photography.

3. A camera provided with a photographing optical system which is made up of at least three lens groups capable of moving for different distances relative to one another and which is switchable in focal length, said camera comprising:

first diaphragm means, arranged at a first inter-lens position of the photographing optical system, for arbitrarily changing an amount of light passing through the photographing optical system in an arbitrary manner;

second diaphragm means, arranged at a second inter-lens position of the photographing optical system, for arbitrarily changing an amount of light passing through the photographing optical system; and diaphragm switching means for switching between the first and second diaphragm means and driving one of the first and second diaphragm means, in accordance with focal length switching.

4. A camera according to claim 3, wherein each of said first and second diaphragm means includes a plurality of diaphragm blades for variably defining an aperture.

5. A camera according to claim 3, wherein each of said first and second diaphragm means includes a liquid-crystal diaphragm member which allows passage of different amounts of light between a time when a current is supplied thereto and a time when a current is not supplied thereto.

6. A camera according to claim 3, wherein:

said first diaphragm means is arranged at a first inter-lens group position of the photographing optical system; and said second diaphragm means is arranged at a second inter-lens group position of the photographing optical system.

7. A camera according to claim 3, wherein said first and second diaphragm means include diaphragm driving sources operating independently of each other.

8. A camera according to claim 7, wherein said driving sources are stepping motors.

9. A camera according to claim 3, wherein the photographing optical system is in a first focal length range when the first diaphragm means is driven and is in a second focal length range different from the first focal length range when the second diaphragm means is driven.

10. A camera according to claim 3, wherein the photographing optical system is in a first focal length range when the first diaphragm means is driven and is in a second focal length range different from the first focal length range when the second diaphragm means is driven.

11. A lens barrel comprising:

a photographing optical system whose focal length can be switched;

a plurality of diaphragm means, arranged at different inter-lens positions defined by lens groups of the photographing optical system, for controlling an amount of light passing through the photographing optical system; and diaphragm switching means for switching between available ones of the plurality of diaphragm means, in accordance with focal length switching.

12. A lens barrel according to claim 11, wherein each of said diaphragm means includes a plurality of diaphragm blades for variably defining an aperture.

13. A lens barrel according to claim 11, wherein each of said diaphragm means includes a liquid-crystal diaphragm member which allows passage of different amounts of light between a time when a current is supplied thereto and a time when a current is not supplied thereto.

14. A camera provided with a photographing optical system which is made up of at least three lens groups capable of moving different distances relative to one another and which is switchable in focal length, said camera comprising:

first diaphragm means, arranged at a first inter-lens position of the photographing optical system, for arbitrarily adjusting an amount of light passing through the photographing optical system;

second diaphragm means, arranged at a second inter-lens position of the photographing optical system, for arbitrarily changing an amount of light passing through the photographing optical system;

a single driving source for driving the first and second diaphragm means; and diaphragm driving-switching means for selectively driving one of the first and second diaphragm means by use of the single driving source, in accordance with focal length switching.

15. A camera according to claim 14, wherein said single driving source is a stepping motor.

16. A camera according to claim 14, further comprising:

diaphragm switching means for switching between the first and second diaphragm means, in accordance with focal length switching, wherein the photographing optical system provides a first focal length when the first diaphragm means is driven and provides a second focal length different from the first focal length when the second diaphragm means is driven.

17. A camera according to claim 14, further comprising:

diaphragm switching means for switching between the first and second diaphragm means, in accordance with focal length switching, wherein the photographing optical system is in a first focal length range when the first diaphragm means is driven and is in a second focal length range different from the first focal length range when the second diaphragm means is driven.

18. A lens barrel provided with a photographing optical system which is made up of at least three lens groups capable of moving for different distances along an optical distance relative to one another and which is switchable in focal length, said lens barrel comprising:

first diaphragm means, arranged at a first inter-lens position of the photographing optical system, for adjusting an amount of light passing through the photographing optical system in an arbitrary manner; and switching means for switching the first diaphragm means between the first inter-lens position and a second inter-lens position different from the first inter-lens position.

19. A camera that is provided with a photographing optical system whose focal distance can be switched, said camera comprising:

a plurality of diaphragm means, respectively arranged in at least two different inter-lens positions, for adjusting an amount of light passing through the photographing optical system;

a single driving source for driving said plurality of diaphragm means; and diaphragm driving-switching means for selectively transmitting a force of the single driving source to one of the first and second diaphragm means in accordance with focal distance switching.

20. A camera that is provided with a photographing optical system whose focal distance is switched from one focal distance to another focal distance by changing intervals between lens groups, said camera comprising:

a first diaphragm, that is arranged at a first inter-lens position of the photographing optical system, and that adjusts an amount of light passing through the photographing optical system;

a second diaphragm that is arranged at a second inter-lens position of the photographing optical system, and that adjusts an amount of light passing through the photographing optical system;

a diaphragm driving member that engages one of the first and second diaphragms and drives the diaphragm in engagement therewith to vary an aperture defined by the one of the first and second diaphragms enagaged therewith; and a single driving source that drives the diaphragm driving member.

21. A camera according to claim 20, wherein each of said first and second diaphragms includes a plurality of diaphragm blades that variably define respective apertures.

22. A camera according to claim 20, further comprising a driving-switch that enables the diaphragm driving member to selectively engage with one of the first and second diaphragms.

23. A camera according to claim 22, wherein said first and second diaphragms are movable in an optical axis direction in accordance with a manner in which the lens groups move at a time of focal distance switching.

24. A camera according to claim 23, wherein the one of the first and second diaphragms that is engaged with the diaphragm driving member changes in accordance with positions to which the first and second diaphragms are moved in the optical axis direction.

* * * * *